US 9,570,753 B2

(12) United States Patent
Dennis et al.

(10) Patent No.: US 9,570,753 B2
(45) Date of Patent: Feb. 14, 2017

(54) REVERSIBLE POLARITY OPERATION AND SWITCHING METHOD FOR ZNBR FLOW BATTERY WHEN CONNECTED TO COMMON DC BUS

(75) Inventors: Kevin Dennis, Waukesha, WI (US); Nathan Coad, Perth (AU); Peter Lex, Menomonee Falls, WI (US); Jeffrey A. Reichard, Oconomowoc, WI (US)

(73) Assignee: EnSync, Inc., Menomonee Falls, WI (US)

( * ) Notice: Subject to any disclaimer, the term of this patent is extended or adjusted under 35 U.S.C. 154(b) by 1212 days.

(21) Appl. No.: 13/591,802

(22) Filed: Aug. 22, 2012

(65) Prior Publication Data
US 2012/0326672 A1 Dec. 27, 2012

Related U.S. Application Data

(63) Continuation-in-part of application No. 13/185,862, filed on Jul. 19, 2011, now Pat. No. 9,093,862, which
(Continued)

(51) Int. Cl.
*H02J 7/00* (2006.01)
*H01M 4/66* (2006.01)
(Continued)

(52) U.S. Cl.
CPC ............ *H01M 4/668* (2013.01); *H01M 4/0471* (2013.01); *H01M 4/96* (2013.01);
(Continued)

(58) Field of Classification Search
CPC .................. H01M 10/448; H01M 10/44; H02J 2007/0067
(Continued)

(56) References Cited

U.S. PATENT DOCUMENTS 4,691,158 A * 9/1987 Hashimoto ........... H02J 7/0073 320/131
5,650,239 A 7/1997 Lex et al.
(Continued)

FOREIGN PATENT DOCUMENTS

EP 0015096 A1 9/1980
JP 2002219464 A 8/2002

OTHER PUBLICATIONS

International Search Report and the Written Opinion of the International Searching Authority, or the Declaration; International Application No. PCT/US2012/051860, mailed Jan. 21, 2013—(9 pages).

*Primary Examiner* — Richard Isla Rodas
*Assistant Examiner* — Johali Torres Ruiz
(74) *Attorney, Agent, or Firm* — Boyle Fredrickson, SC

(57) ABSTRACT

An improved electrolyte battery is provided that includes a tank assembly adapted to hold an amount of an anolyte and a catholyte, a number of cell stacks operably connected to the tank assembly, each stack formed of a number of flow frames disposed between end caps and a number of power converters operatively connected to the cell stacks. The cell stacks are formed with a number of flow frames each including individual inlets and outlets for anolyte and catholyte fluids and a separator disposed between flow frames defining anodic and cathodic half cells between each pair of flow frames. The power converter is configured to connect the battery with either forward or reverse polarity to a DC power source, such as a DC bus. The anodic and cathodic half cells switch as a function of the polarity by which the battery is connected to the Dc power source.

5 Claims, 29 Drawing Sheets

Related U.S. Application Data is a continuation-in-part of application No. 12/355,169, filed on Jan. 16, 2009, now Pat. No. 8,008,808.

(60) Provisional application No. 61/526,146, filed on Aug. 22, 2011.

(51) Int. Cl.

| | | |
|---|---|---|
| *H02J 1/10* | (2006.01) | |
| *H02J 7/34* | (2006.01) | |
| *H01M 4/04* | (2006.01) | |
| *H01M 4/96* | (2006.01) | |
| *H01M 10/36* | (2010.01) | |
| *H01M 10/46* | (2006.01) | |
| *H01M 8/02* | (2016.01) | |
| *H01M 12/08* | (2006.01) | |
| *H01M 8/18* | (2006.01) | |
| *H01M 4/88* | (2006.01) | |

(52) U.S. Cl.
CPC ....... *H01M 8/0213* (2013.01); *H01M 8/0221* (2013.01); *H01M 8/0226* (2013.01); *H01M 10/365* (2013.01); *H01M 10/46* (2013.01); *H01M 12/085* (2013.01); *H02J 1/10* (2013.01); *H02J 7/34* (2013.01); *H01M 4/8875* (2013.01); *H01M 8/188* (2013.01); *Y02E 60/50* (2013.01); *Y02E 60/528* (2013.01)

(58) Field of Classification Search
USPC ................................ 320/131, 135, 127, 136
See application file for complete search history.

(56) References Cited

U.S. PATENT DOCUMENTS

| | | | |
|---|---|---|---|
| 5,677,612 A * | 10/1997 | Campagnuolo | H01M 6/5033 320/100 |
| 6,353,304 B1 * | 3/2002 | Atcitty | H02J 7/0022 320/116 |
| 7,939,190 B2 | 5/2011 | Colello et al. | |
| 2004/0080406 A1 | 4/2004 | Huang | |
| 2004/0136212 A1 * | 7/2004 | Abe | H02M 3/18 363/59 |
| 2010/0013324 A1 * | 1/2010 | Yamashita | H01M 10/44 307/125 |
| 2010/0119937 A1 | 5/2010 | Winter | |
| 2010/0227204 A1 | 9/2010 | Zito | |

\* cited by examiner

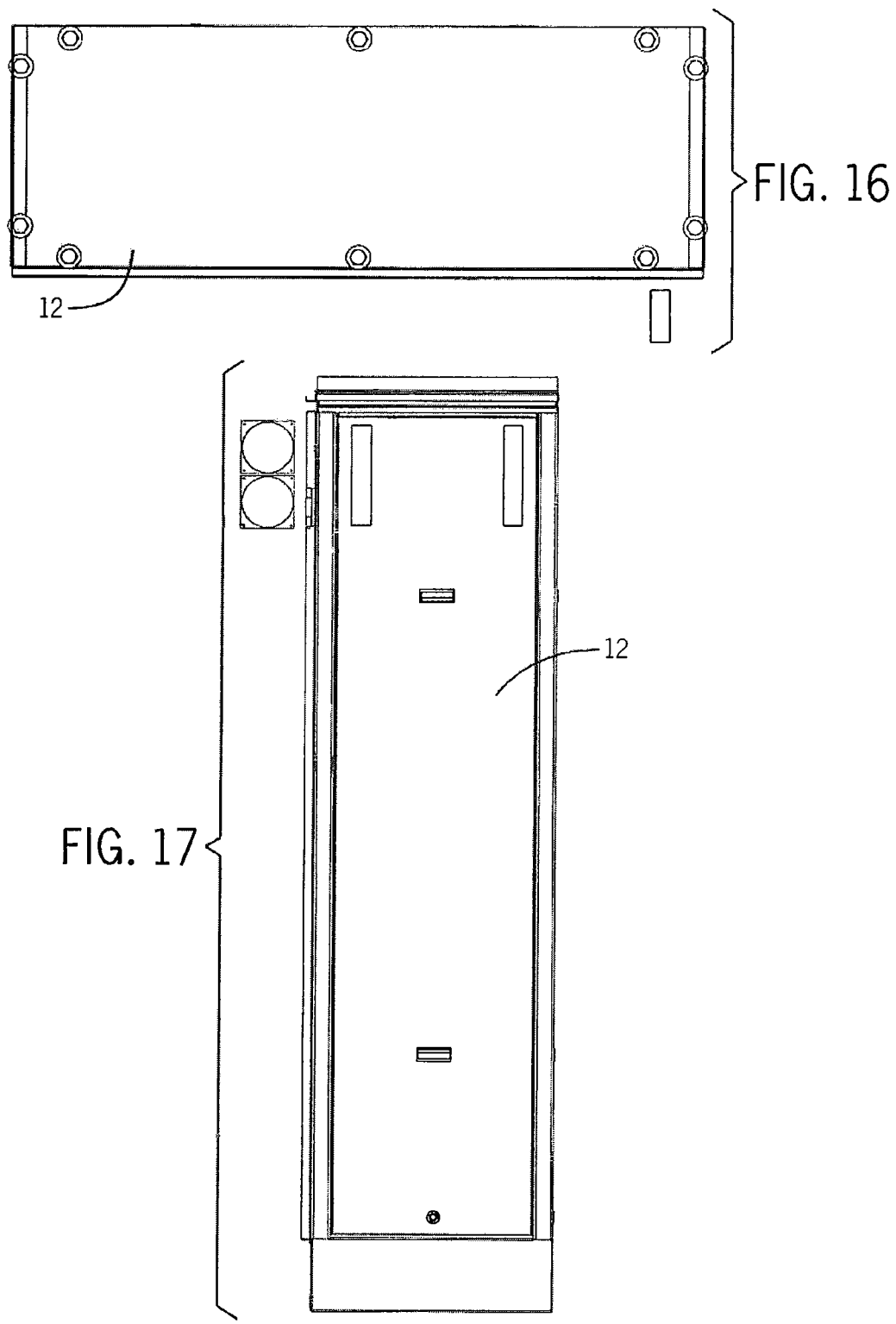

REVERSIBLE POLARITY OPERATION AND SWITCHING METHOD FOR ZNBR FLOW BATTERY WHEN CONNECTED TO COMMON DC BUS

CROSS-REFERENCE TO RELATED APPLICATIONS

This application claims priority to U.S. provisional application Ser. No. 61/526,146, filed Aug. 22, 2011 and entitled Power Systems Formed with Cell Stacks Including a Number of Flowing Electrolyte Batteries and Methods of Operation. This application is also a continuation-in-part of U.S. patent application Ser. No. 13/185,862, filed Jul. 19, 2011 now U.S. Pat. No. 9,093,862 and entitled Method and Apparatus for Controlling a Hybrid Power System, which is, in turn, a continuation-in-part of U.S. patent application Ser. No. 12/355,169, filed Jan. 16, 2009, entitled Method and Apparatus for Controlling a Hybrid Power System, which issued as U.S. Pat. No. 8,008,808 on Aug. 30, 2011. The entire contents of each of the afore-mentioned applications are incorporated herein by reference.

BACKGROUND OF THE INVENTION

The present invention relates generally to power supply systems, and more specifically to power supply systems including flowing electrolyte batteries.

Batteries used in certain prior art stand alone power supply systems are commonly lead-acid batteries. However, lead-acid batteries have limitations in terms of performance and environmental safety. Typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal.

Flowing electrolyte batteries, such as zinc-bromine batteries, zinc-chlorine batteries, and vanadium flow batteries, offer a potential to overcome the above mentioned limitations of lead-acid batteries. In particular, the useful lifetime of flowing electrolyte batteries is not affected by deep discharge applications, and the energy to weight ratio of flowing electrolyte batteries is up to six times higher than that of lead-acid batteries.

However, manufacturing flowing electrolyte batteries can be more difficult than manufacturing lead-acid batteries. A flowing electrolyte battery, like a lead acid battery, comprises a stack of cells to produce a certain voltage higher than that of individual cells. But unlike a lead acid battery, cells in a flowing electrolyte battery are hydraulically connected through an electrolyte circulation path. This can be problematic as shunt currents can flow through the electrolyte circulation path from one series-connected cell to another causing energy losses and imbalances in the individual charge states of the cells. To prevent or reduce such shunt currents, flowing electrolyte batteries require sufficiently long electrolyte circulation paths between cells, thereby increasing electrical resistance between cells.

Another problem of flowing electrolyte batteries is a need for a uniform electrolyte flow rate in each cell in order to supply chemicals evenly inside the cells. To achieve a uniform flow rate through the cells, flowing electrolyte batteries define complex flow distribution zones. However, because electrolyte often has an oily, aqueous and gaseous multiphase nature, and because of structural constraints on the cells, uniform flow rates are often not achieved.

Another issue in these types of batteries where the battery employs an array of stacks of cells is that the stacks share a common flowing electrolyte. Since the stacks share the electrolyte, measurements of the open-circuit voltage across a stack only indicate whether the stack stores some non-zero amount of charge, rather than indicating the stack's state of charge relative to the other stacks in the system. Moreover, differences in the open circuit voltages between stacks are typically indicative of some internal abnormality that has altered a stack's internal resistance.

For example, in a zinc-bromine flowing electrolyte battery, the stacks share an aqueous zinc bromide electrolyte and have their own electrodes for deposit and dissolution of elemental zinc during charge and discharge cycles. In this type of battery, the electrolyte flow to a stack can be inhibited by poorly placed zinc deposits. Additionally, nucleation on the electrodes can cause dendrite formation and branching between cells. In either case, the internal resistance of the affected stack or the open-circuit voltage across the stack could be lowered.

Differences in open-circuit voltages between parallel-connected stacks in flowing electrolyte battery systems can affect the charge and discharge cycles of the stacks and, potentially, the operation of the battery. For example, in the aforementioned zinc-bromine battery, a lowered open circuit voltage in a particular stack causes an increase in the rate of zinc accumulation in the faulty stack during the charge cycle and a decrease in the rate of zinc reduction in the faulty stack during the discharge cycle. Moreover, the additional zinc stored in the faulty stack typically comes from the electrolyte normally utilized by neighboring stacks. As a result of the lowered zinc availability, the energy storage capacity of the neighboring stacks may be reduced. Another consequence is that the stack having the increased zinc accumulation does not fully deplete the zinc during discharge; eventually resulting in zinc accumulating on the electrodes of the faulty stack to such an extent that it causes internal short circuiting between the cells of the stack. This can potentially destroy the stack and possibly, the entire battery system. A further consequence is that the increased zinc accumulation can restrict the channels through which the electrolyte flows. As the electrolyte flow acts to cool the stack, the restricted flow may cause the stack to overheat.

In order to restore open-circuit voltages to a more uniform value, an equalization process may be executed. The equalization process includes fully "stripping", i.e., fully discharging, each stack in the battery, completely removing any stored charge from all of the cells in all of the stacks. Ideally, this process eliminates the abnormality that initially caused the difference in open-circuit voltage between the stacks. For example, a full strip typically dissolves dendrites between plates and/or deposits obstructing electrolyte flow. However, a full strip of each of the cell stacks in the battery typically renders the battery entirely unavailable or available at a significantly reduced capacity for electrical applications, necessitating the purchase and installation of additional redundant battery systems. Moreover, a full strip is often unnecessary since typically a minority of the stacks in the battery is operating abnormally.

In addition, existing methods of stripping battery stacks in a flowing electrolyte battery are typically time consuming and may have to be repeated every few days for a recurring problem. When stripping, i.e., fully discharging, a cell stack, care must be taken to avoid cell reversal in which the polarity of one of the stacks becomes opposite the polarity of the other stacks. In such an instance, the cell stack with the reversed polarity becomes a load, drawing current from the other stacks. Thus, during discharge, a cell stack is first discharged to a low voltage level using a higher current. When the stack reaches the low voltage level, the magnitude of the current is reduced to slow the rate of discharge. As the voltage level continues to drop, the magnitude of current is repeatedly stepped down to reduce the rate of discharge as the voltage level approaches zero. By approaching the zero voltage level at a slow rate, discharge of the cell stack is discontinued when zero voltage is reached. While this stepped reduction in the discharge current avoids cell reversal, it is also a significant factor in the time required to strip the cell stacks in a battery.

Therefore, there is a need for an improved electrolyte flow battery design and methods and apparatus for controlling, monitoring, charging and/or discharging cells in a flowing electrolyte battery.

BRIEF DESCRIPTION OF THE INVENTION

Various aspects of the present invention have been developed to overcome or alleviate one or more limitations of the prior art including providing improved structures of the cell stack and the individual cells to reduce manufacturing costs and to improve the structure of a cell stack for a flowing electrolyte battery and providing improved control of power flow between the battery and a common bus to which it is connected to reduce the amount of time required to equalize individual stacks in a battery system.

Thus, according to one aspect of the present invention, the invention provides an improved cell stack including modular battery cells to reduce manufacturing costs and to improve the structure and implementation and operation of a cell stack for a flowing electrolyte battery.

According to another aspect of the present invention, the invention addresses the deficiencies in the prior art by providing, in various embodiments, improved methods, systems and features for controlling, monitoring, charging and/or discharging (collectively "controlling") flowing electrolyte batteries. According to one aspect, the invention addresses the deficiencies in the prior art by providing methods, systems and features for controlling individual stacks of battery cells in a flowing electrolyte battery. In a further embodiment, the invention provides methods, systems and features for controlling individual battery stacks in a flowing electrolyte battery. Among other advantages, the invention increases the flexibility with which cell stacks can be charged and stripped; enables regular and ongoing battery maintenance, without taking the battery offline; maintains the battery at a predictable and consistent charge capacity; reduces the likelihood of stack failures due, for example, to electrolyte flow blockage, thermal runaway, and/or dendrite formation; reduces the risk of uneven cell plating; increases the number of charge/discharge cycles available; and reduces expenses relating to maintaining redundant battery systems.

According to yet another aspect of the present invention, an improved electrolyte battery is provided that includes a tank assembly adapted to hold an amount of an anolyte and a catholyte, a number of cell stacks operatively connected to the tank assembly, each stack formed of a number of flow frames disposed between end caps and a number of power converters operatively connected to the cell stacks. The cell stacks are formed with a number of flow frames each including individual inlets and outlets for anolyte and catholyte fluids and a separator disposed between flow frames defining anodic and cathodic half cells between each pair of flow frames. The power converter is configured to connect the battery with either forward or reverse polarity to a DC power source, such as a DC bus. The anodic and cathodic half cells switch as a function of the polarity by which the battery is connected to the DC power source.

According to one embodiment of the invention, a power converter for regulating current flow between a DC bus and an energy storage device includes a first set of terminals configured to be connected to the DC bus and a second set of terminals configured to be connected to the energy storage device. The first set of terminals has a first electrical polarity and the second set of terminals has a second polarity. A plurality of switches selectively connects the first set of terminals to the second set of terminals. A memory device stores a plurality of instructions, and a processor is configured to execute the plurality of instructions for operation in a first operating mode and a second operating mode. During the first operating mode, the first electrical polarity and the second electrical polarity are the same, and during the second operating mode, the first electrical polarity and the second electrical polarity are reversed.

According to another aspect of the invention, the plurality of switches may further include a first set of switches configured to regulate current flow between the DC bus and the energy storage device and a second set of switches configured to select one of the first operating mode and the second operating mode. The energy storage device may be a flow battery having at least one cell stack. The power converter then regulates the current flow between the DC bus and either one cell stack of the flow battery or a plurality of cell stacks of the flow battery.

According to another embodiment of the invention, a method of controlling the level of charge on a battery connected to a DC bus via a power converter includes the steps of receiving a command at the power converter to begin discharging the battery, regulating current flow between the battery and the DC bus at a first amplitude by generating a plurality of switching signals within the power converter to control a plurality of switches to selectively connect the battery to the DC bus, and monitoring the amplitude of voltage present on the battery. The frequency at which the switching signals are generated is increased and the current flow is regulated at a second amplitude between the battery and the DC bus when the amplitude of voltage present on the battery reaches a first threshold. At least one of the switches is latched on when the amplitude of voltage present on the battery reaches a second threshold, and discharging of the battery is disabled when the amplitude of voltage present on the battery is substantially zero.

According to another aspect of the invention, regulating current flow between the battery and the DC bus at a first amplitude is performed with a first polarity of voltage on the battery. After discharging of the battery is disabled, the method further includes the step of regulating current flow between the battery and the DC bus by generating a plurality of switching signals within the power converter to control a plurality of switches to selectively connect the battery to the DC bus according to a second polarity, where the second polarity is opposite the first polarity.

According to still another embodiment of the invention, a method of controlling the level of charge on a battery connected to a DC bus via a power converter includes the steps of receiving a command at the power converter to begin discharging the battery, regulating current flow between the battery and the DC bus by generating a plurality of switching signals within the power converter to control a plurality of switches to selectively connect the battery to the DC bus according to a first polarity, and monitoring the amplitude of voltage present on the battery. Discharging of the battery is disabled when the amplitude of voltage present on the battery is substantially zero, and current flow between the battery and the DC bus is regulated by generating a plurality of switching signals within the power converter to control a plurality of switches to selectively connect the battery to the DC bus according to a second polarity, where the second polarity is opposite the first polarity.

According to yet another aspect of the invention and after the step of monitoring the amplitude of voltage present on the battery, the method further includes the steps of regulating current flow between the battery and the DC bus at a first amplitude, increasing the frequency at which the switching signals are generated when the amplitude of voltage present on the battery reaches a first threshold, regulating current flow between the battery and the DC bus at a second amplitude when the amplitude of voltage present on the battery reaches the first threshold, and latching on at least one of the switches when the amplitude of voltage present on the battery reaches a second threshold.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 16 is a top plan view of the module of FIG. 14;

FIG. 17 is a right side plan view of the module of FIG. 14;

Figure 1:
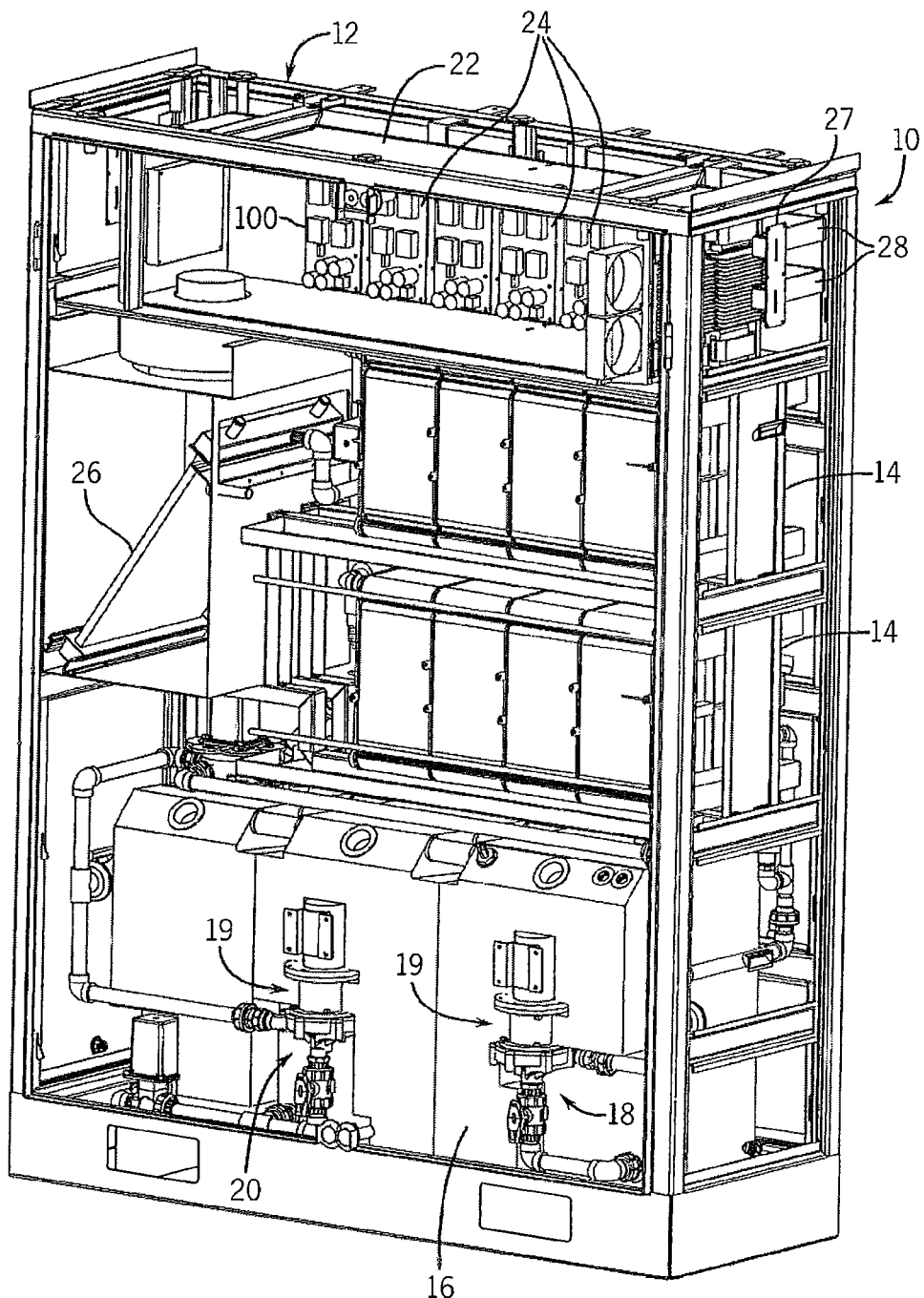
FIG. 1 is an isometric view of the battery module constructed according to the present disclosure.
Figure 2:
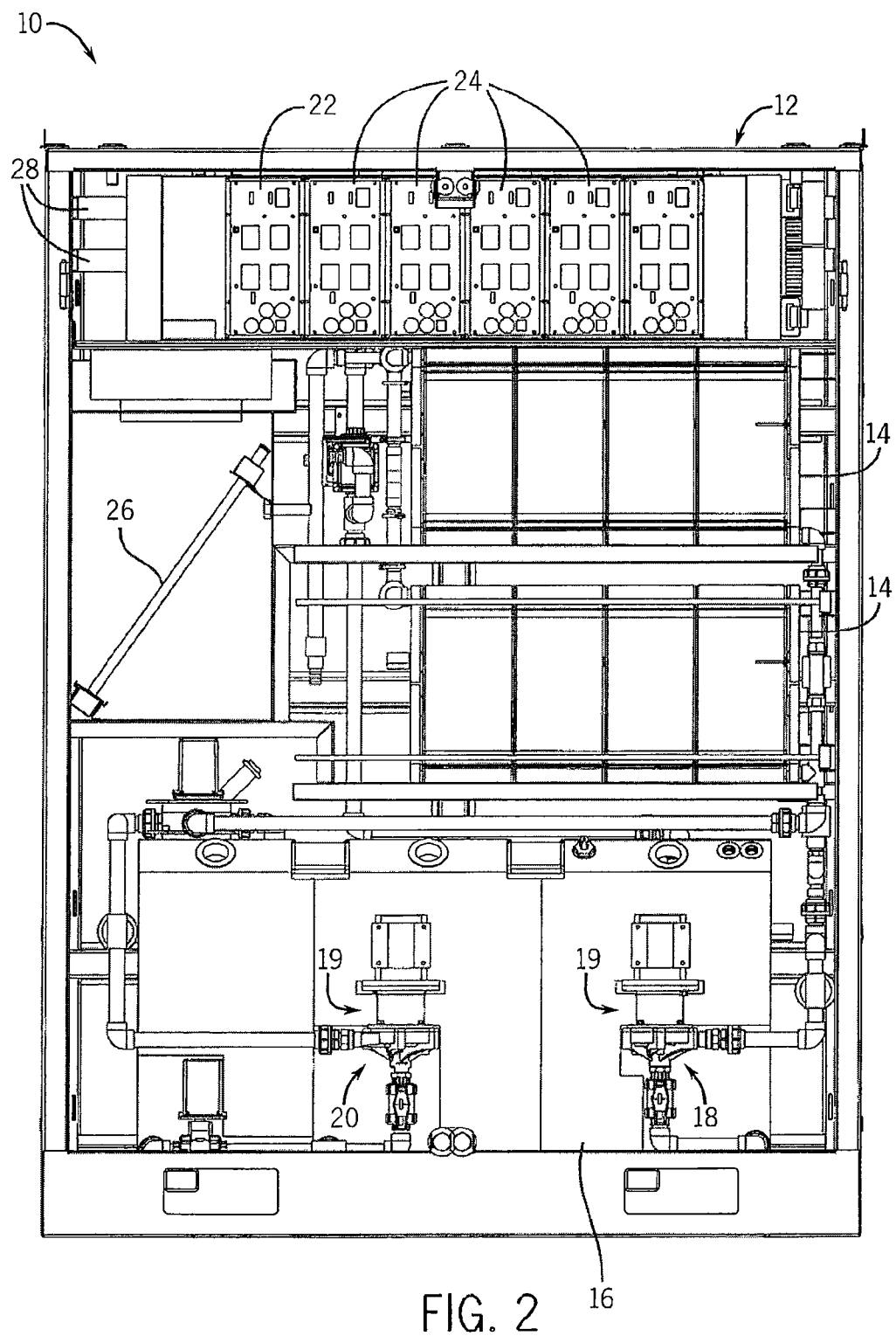
FIG. 2 is a front plan view of the module of FIG. 1.
Figure 3:
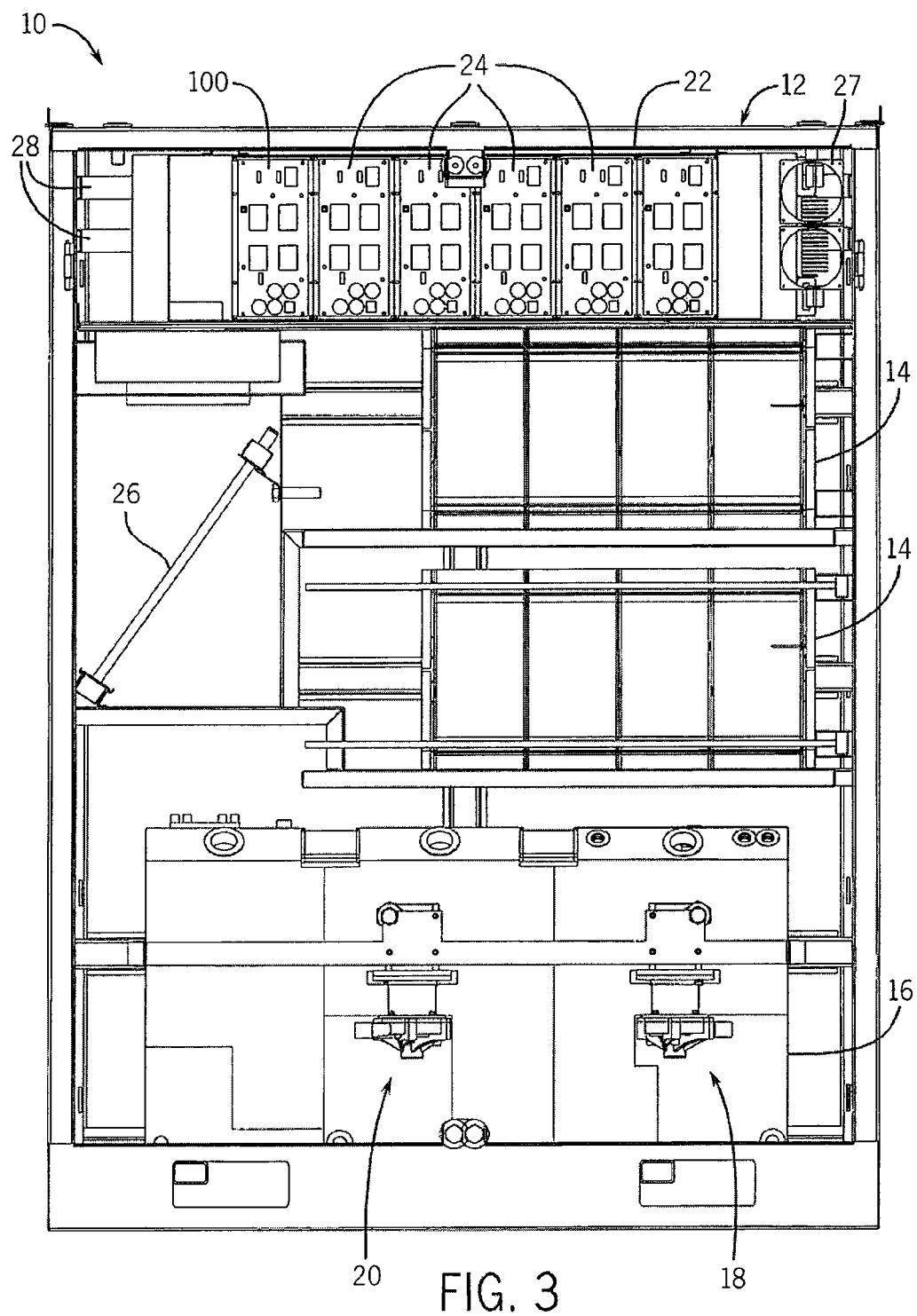
FIG. 3 is a partial front plan front view of the module of FIG. 1.
Figure 4:
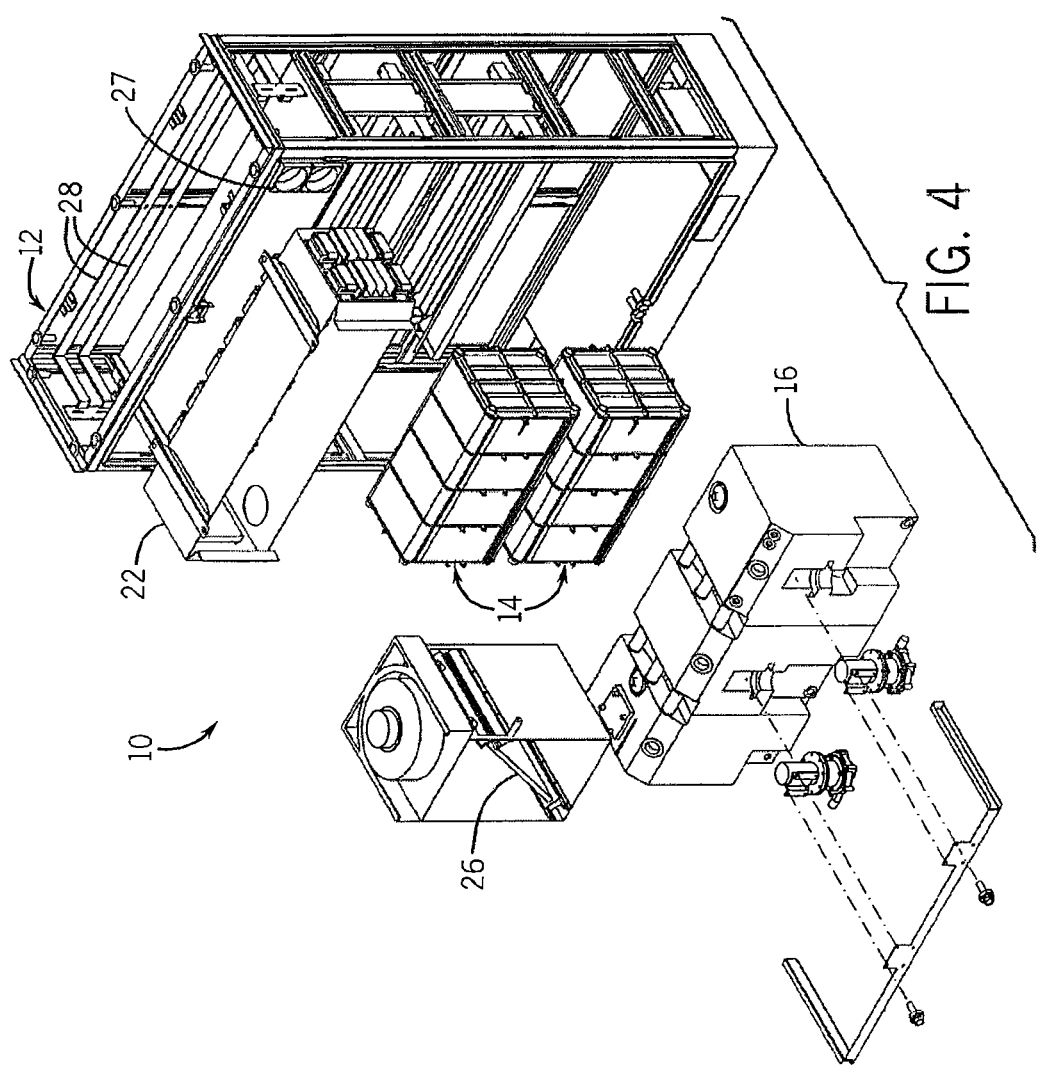
FIG. 4 is an exploded, isometric view of the module of FIG. 3.
Figure 5:
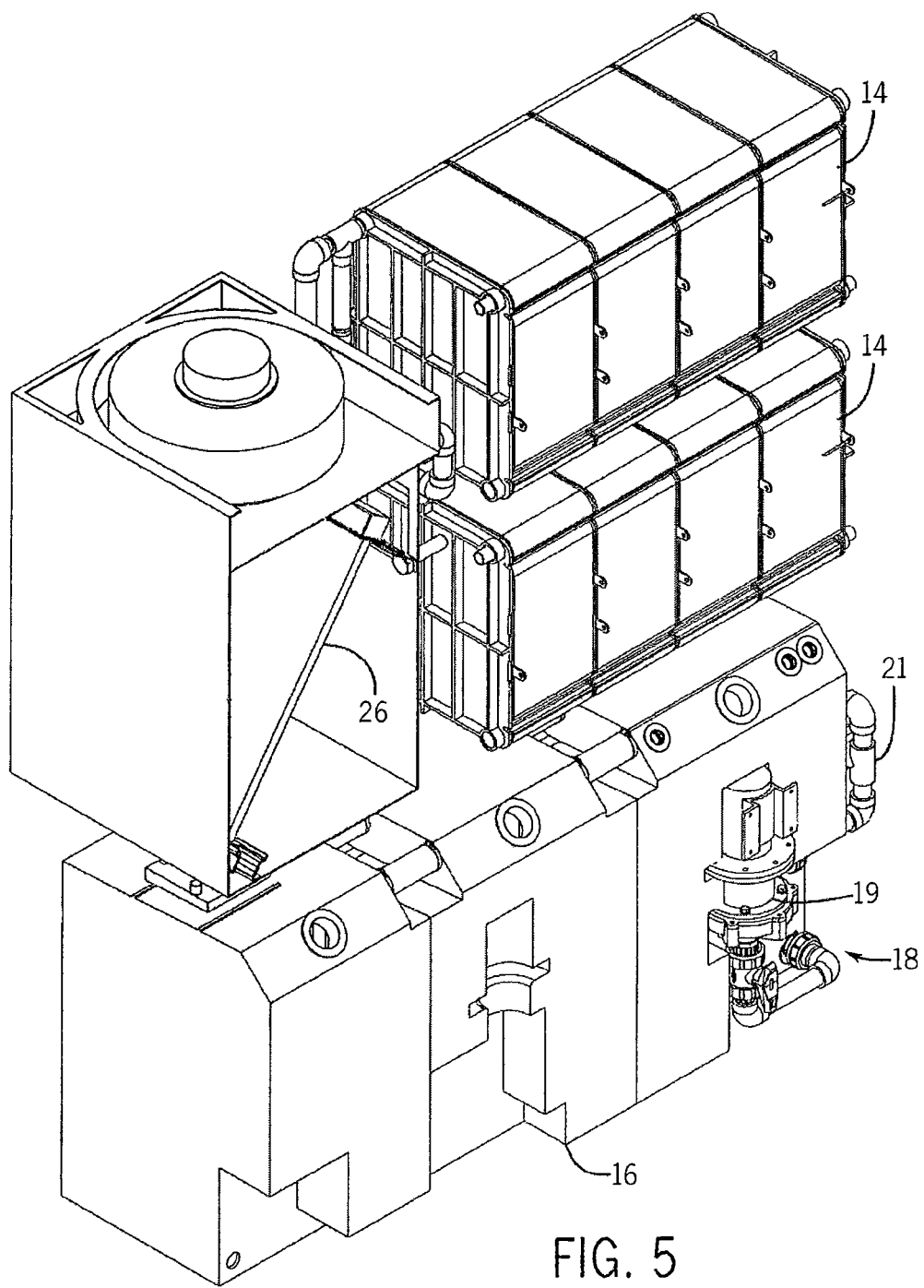
FIG. 5 is an isometric view of the anolyte flow system of the module of FIG. 1.
Figure 6:
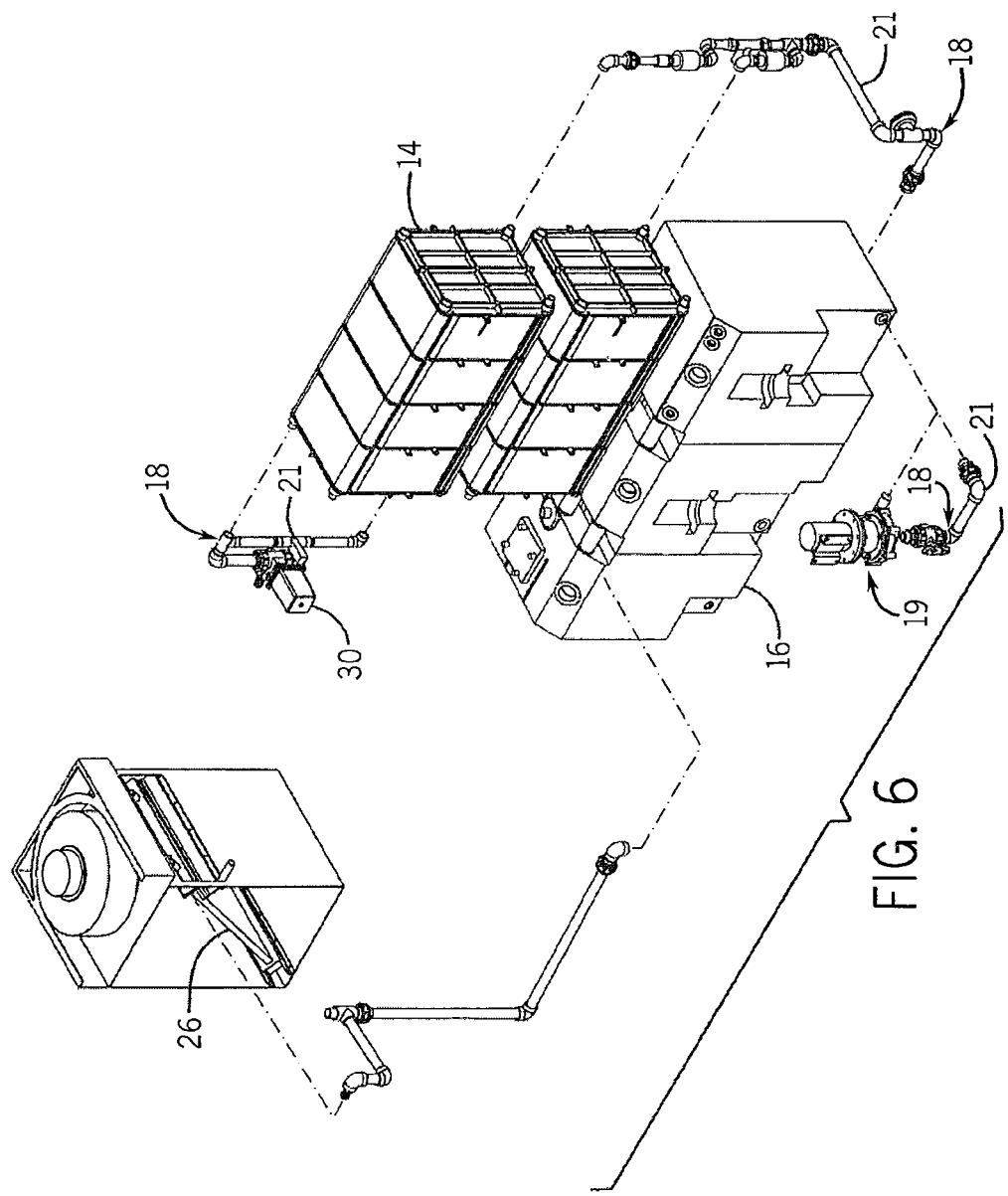
FIG. 6 is an exploded, isometric view of the flow system of FIG. 5.
Figure 7:
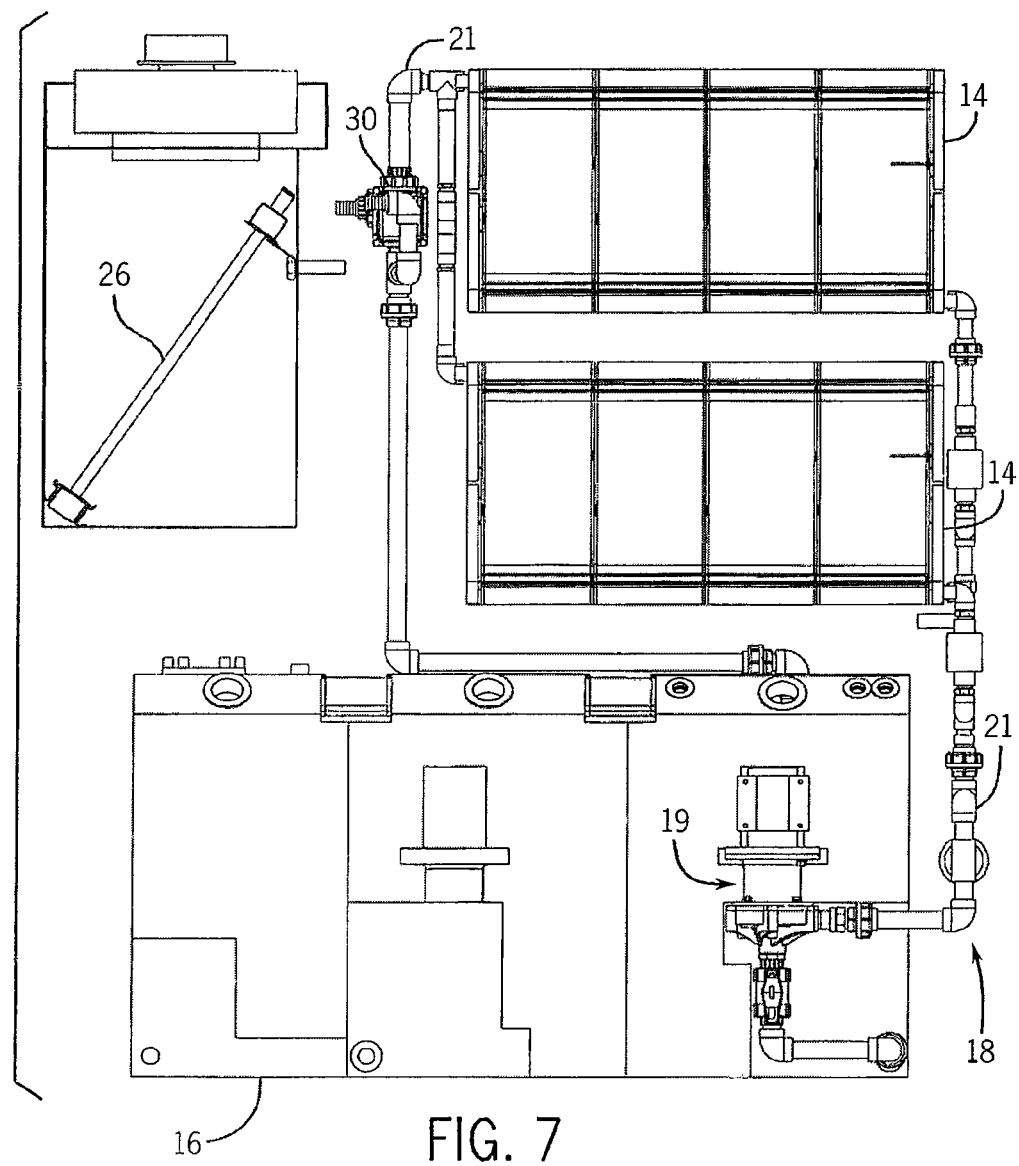
FIG. 7 is a front plan view of the flow system of FIG. 5.
Figure 8:
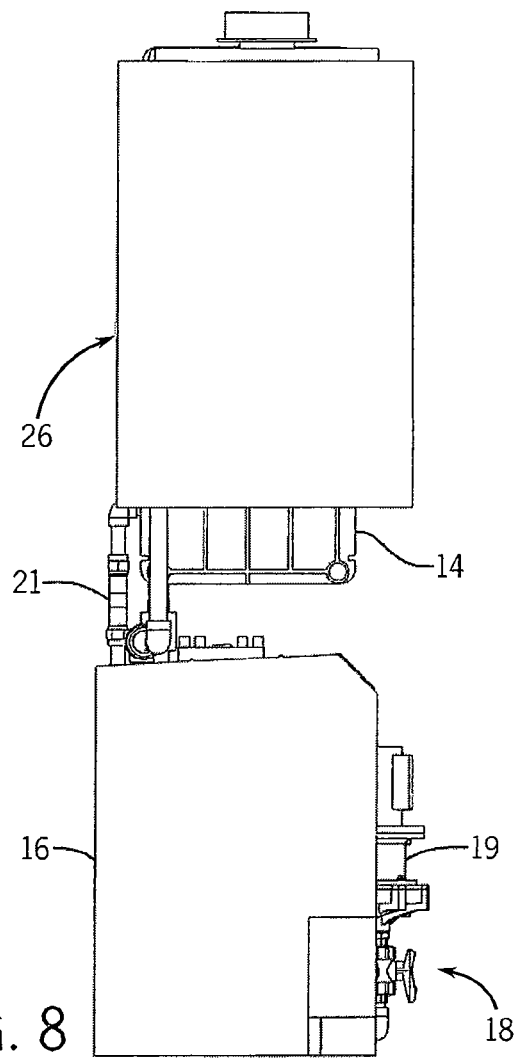
FIG. 8 is a side plan view of the flow system of FIG. 5.
Figure 9:
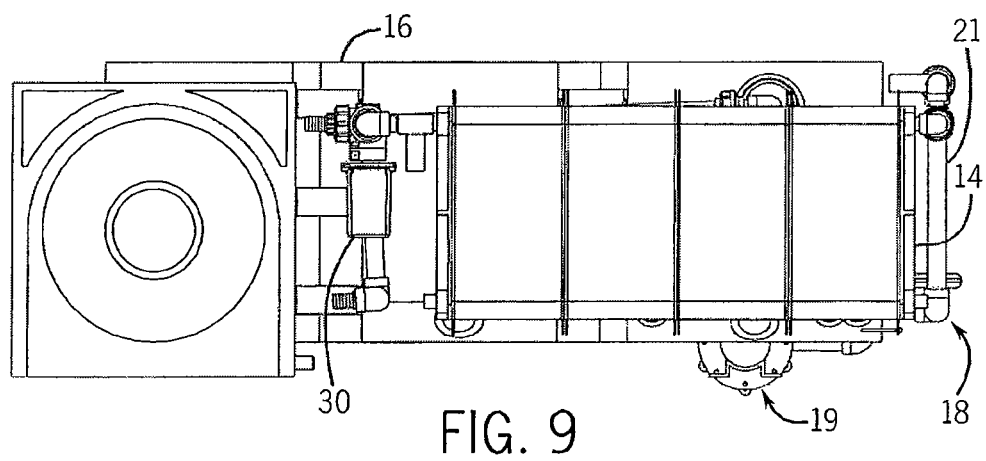
FIG. 9 is a top plan view of the flow system of FIG. 5.
Figure 10:
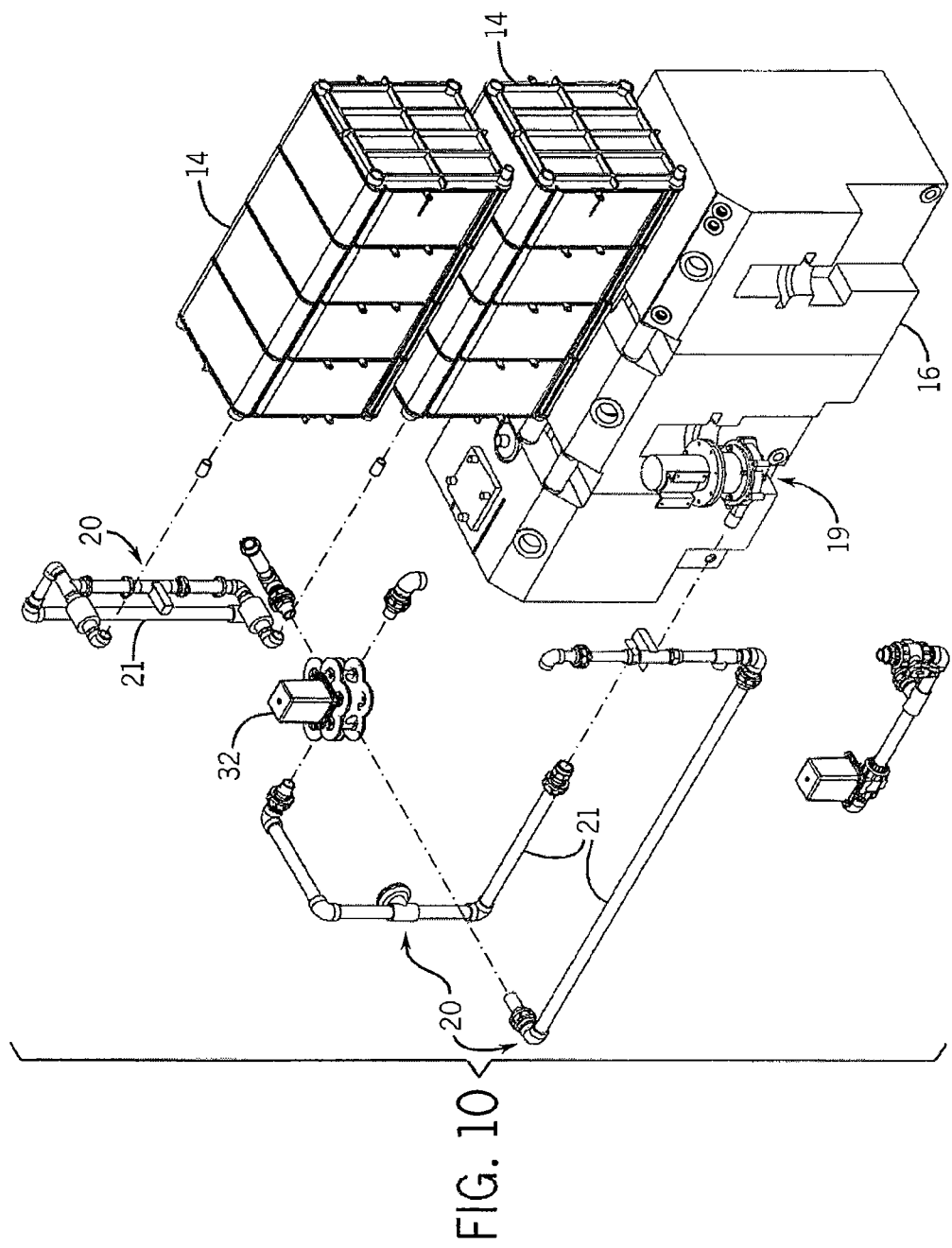
FIG. 10 is an exploded, isometric view of a catholyte flow system of the module of FIG. 1.
Figure 11:
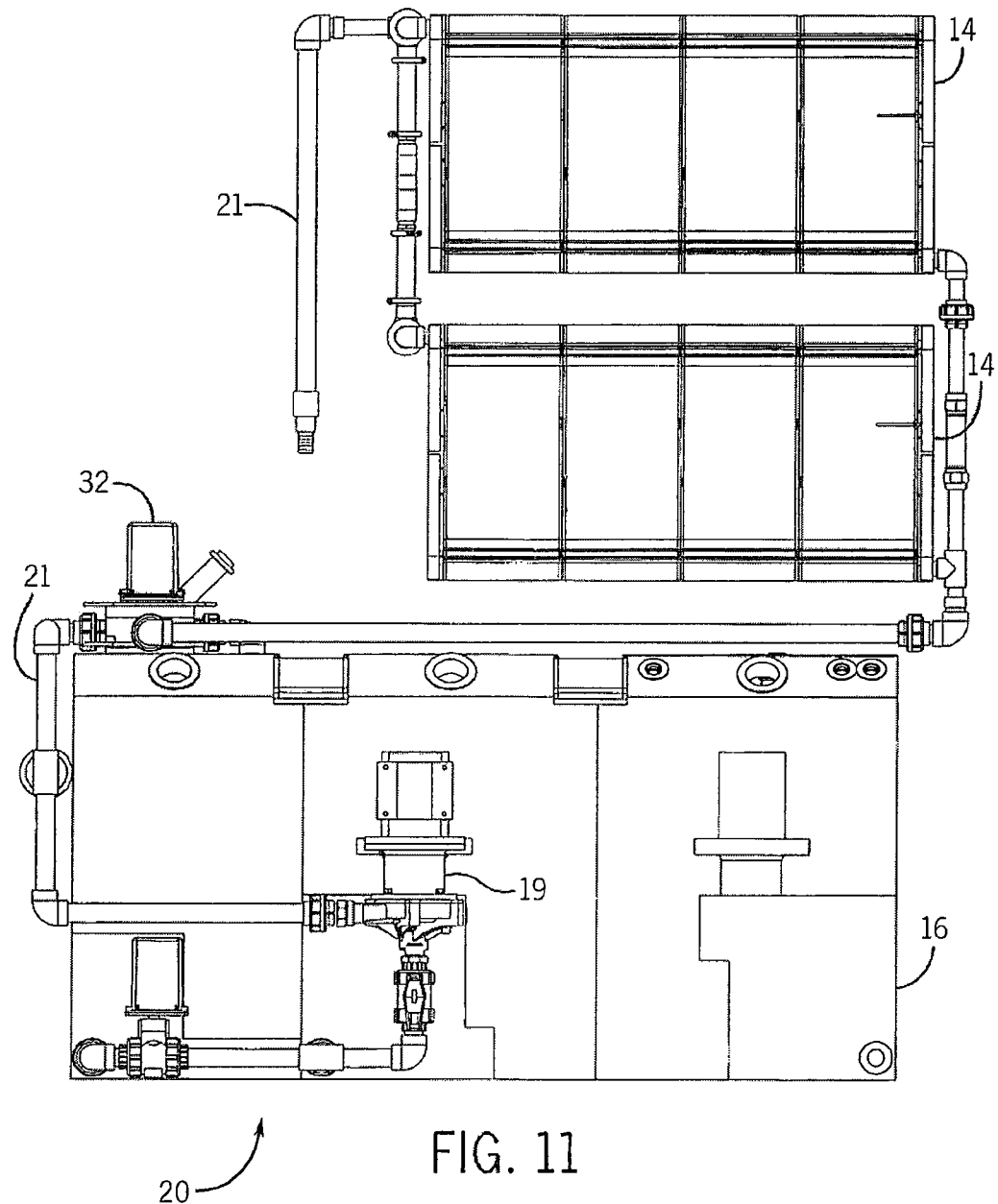
FIG. 11 is a front plan view of the flow system of FIG. 10.
Figure 12:
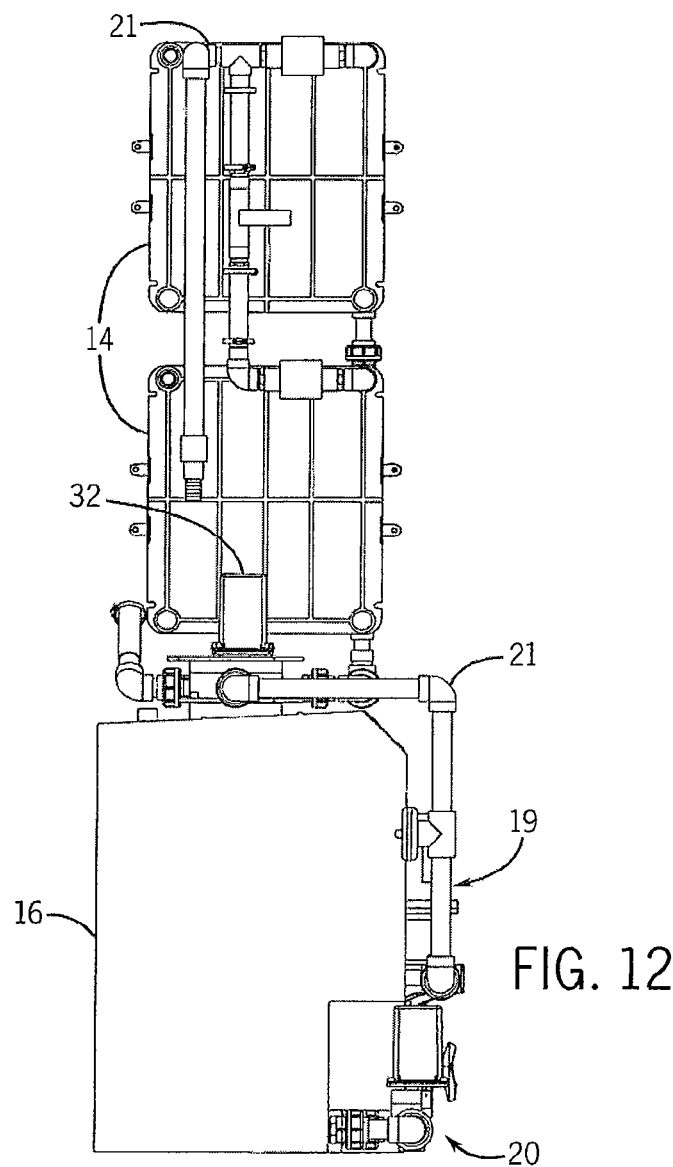
FIG. 12 is a side plan view of the flow system of FIG. 10.
Figure 13:
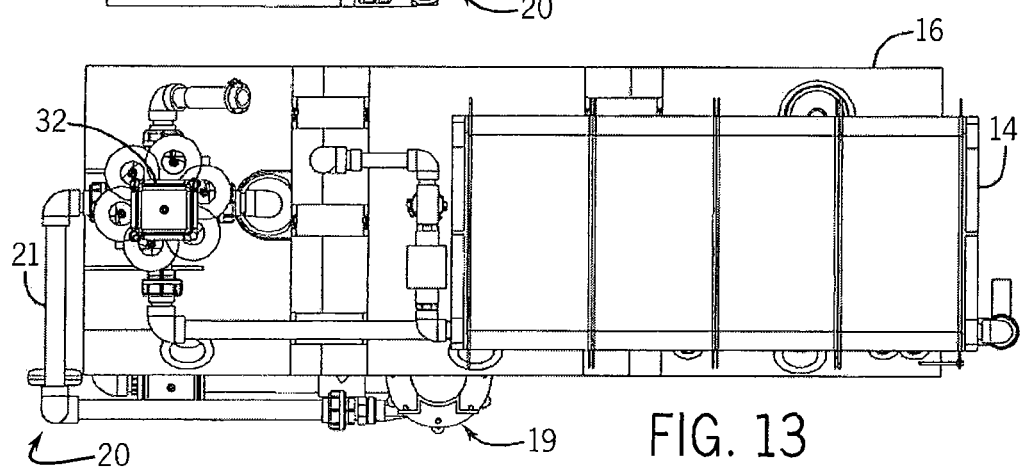
FIG. 13 is a top plan view of the flow system of FIG. 10.
Figure 14:
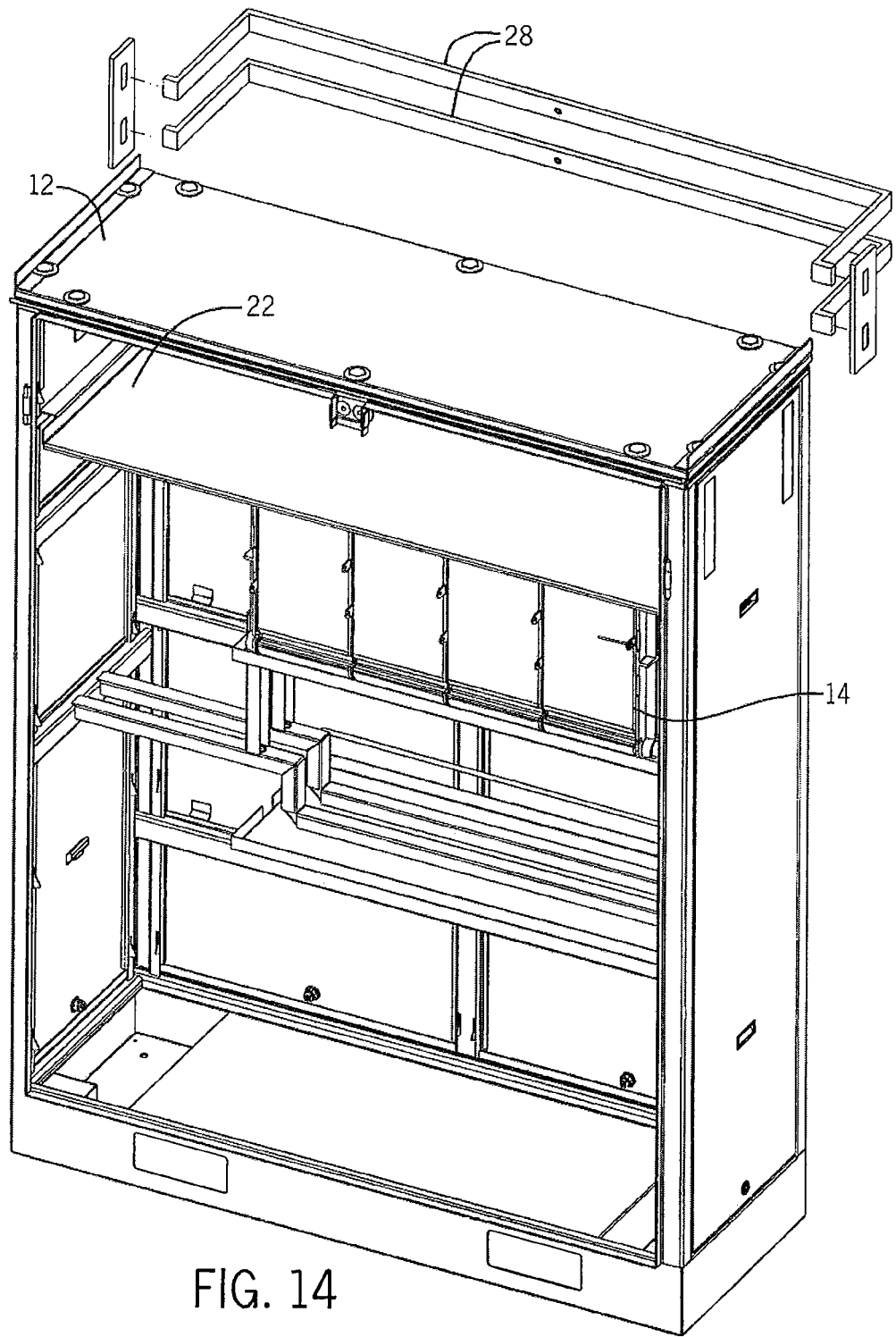
FIG. 14 is a partial exploded, isometric view of the module of FIG. 1.
Figure 15:
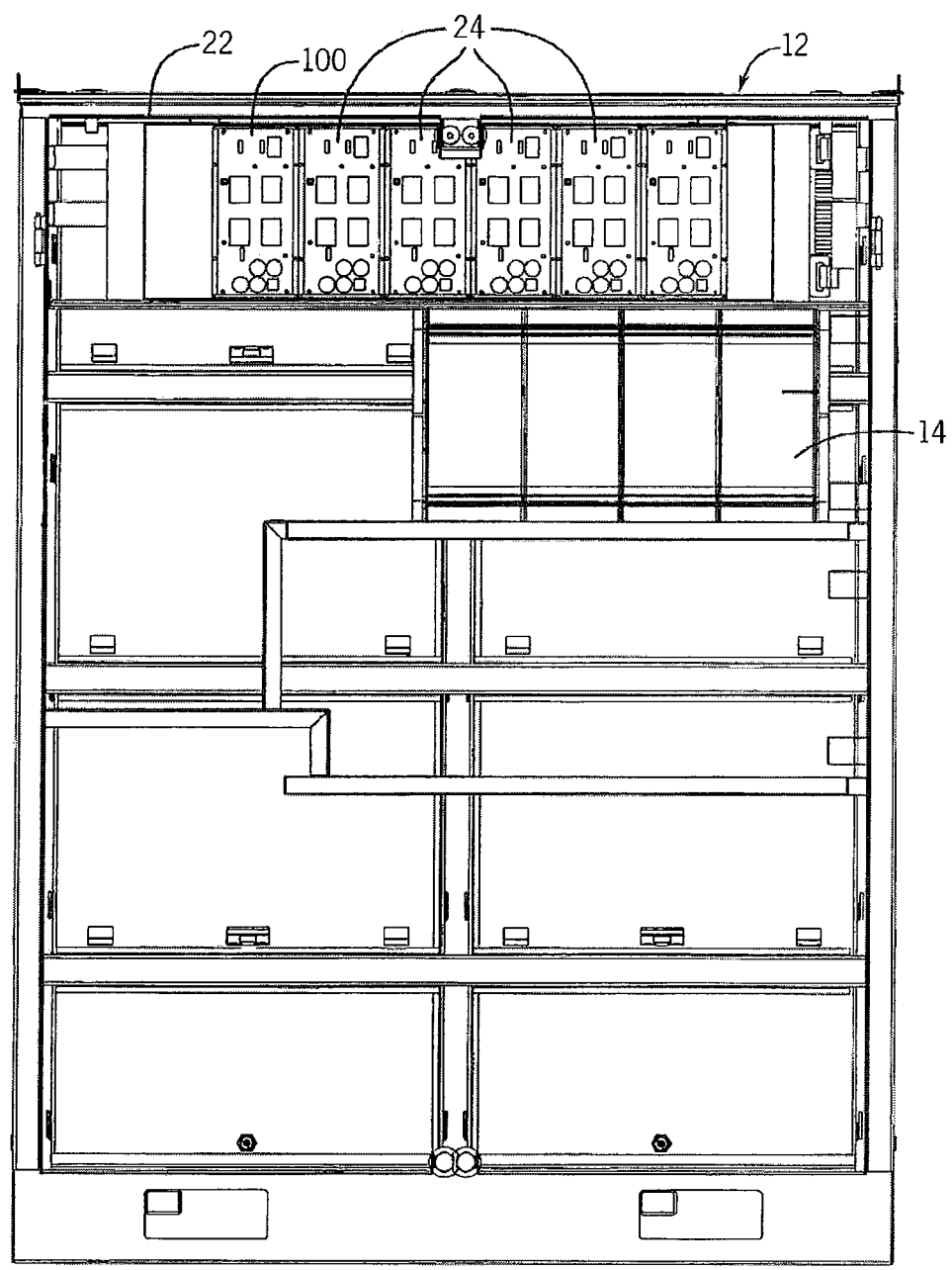
FIG. 15 is a front plan view of the module of FIG. 14.
Figure 18:
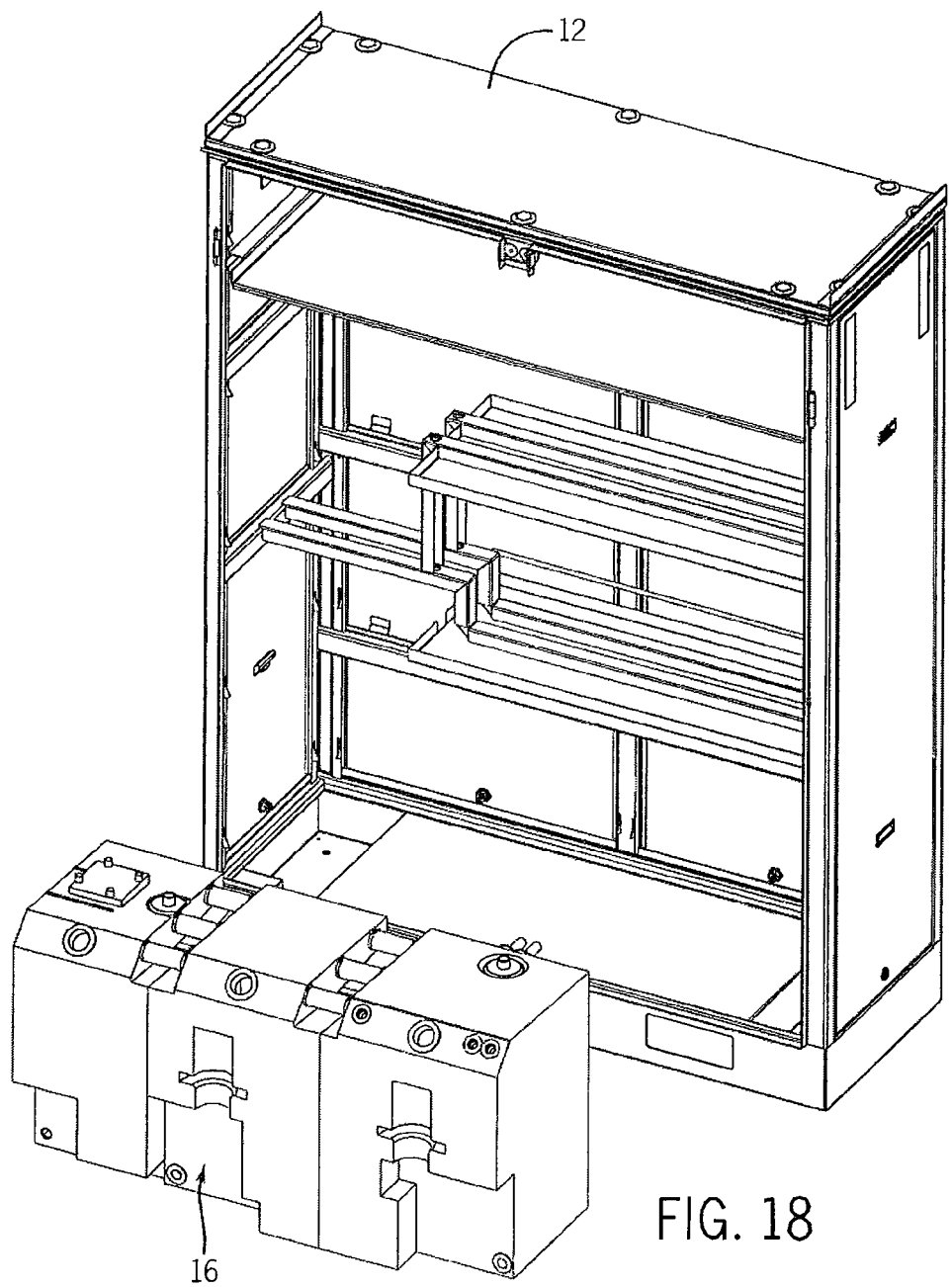
FIG. 18 is a partial exploded, isometric view of the module of FIG. 1.
Figure 19:
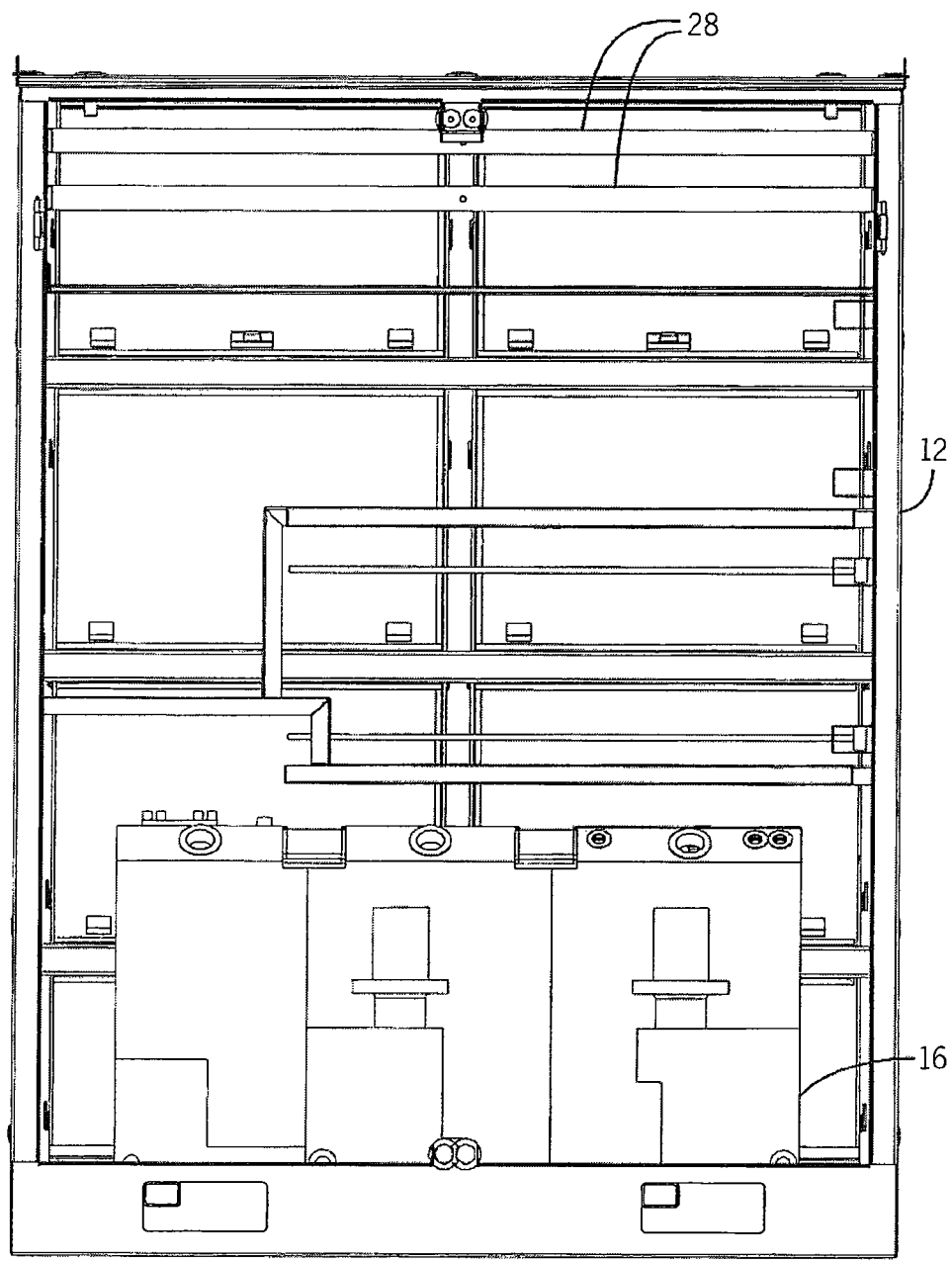
FIG. 19 is a front plan view of the module of FIG. 18.
Figure 20:
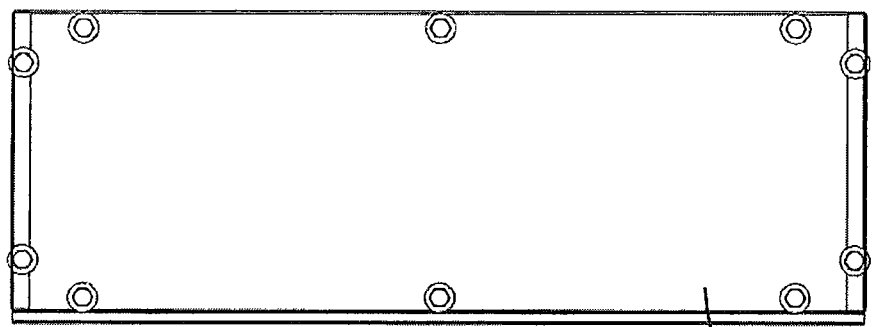
FIG. 20 is a top plan view of the module of FIG. 18.
Figure 21:
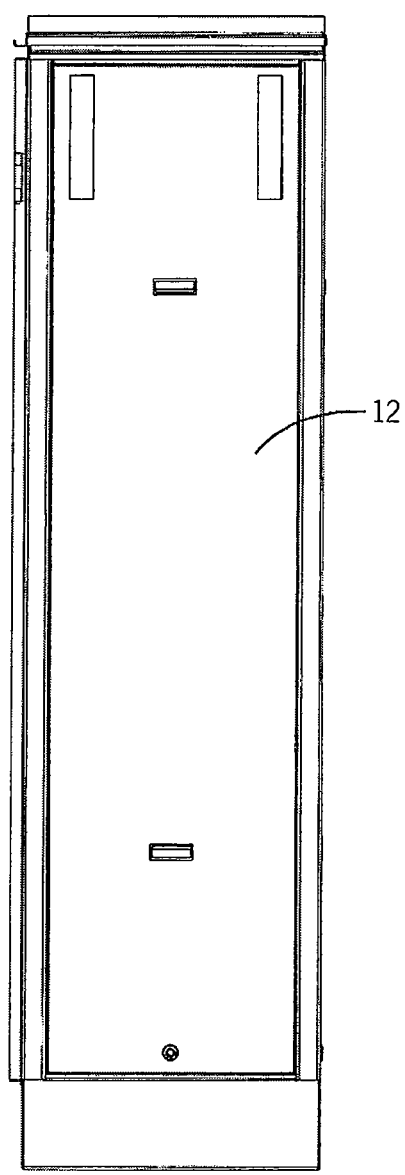
FIG. 21 is a right side plan view of the module of FIG. 18.
Figure 22:
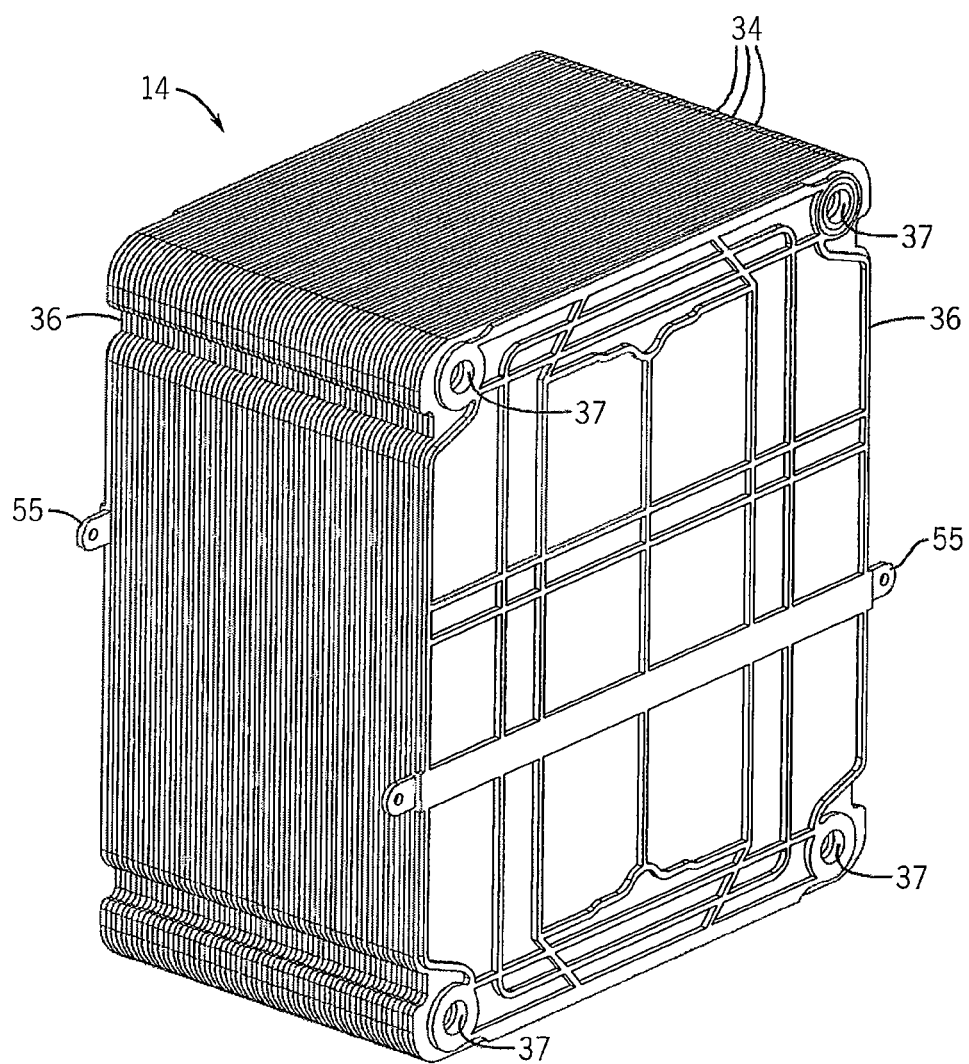
FIG. 22 is an isometric view of a cell stack for use in the module of FIG. 1.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

With reference now to the drawing figures in which like reference numerals designate like parts throughout the disclosure, the electrolyte battery module and system according to one embodiment of the present invention is illustrated generally at 10 in FIGS. 1-4 and 14-21. The battery system 10 includes as general components a cabinet 12, an assembly of cell stacks 14 positioned within the cabinet 12, a tank assembly 16 positioned within the cabinet 12. The tank assembly 16 includes an anolyte flow system 18 (FIGS. 5-9) and and a catholyte flow system 20 (FIGS. 10-13) each having a pump 19 and suitable piping 21 operably connected to the cell stacks 14. The anolyte is the portion of the electrolyte in proximity to the anode, or negative cell, in the battery, and, the catholyte is the portion of the electrolyte in proximity to the cathode, or positive cell, in the battery. In a discharged state, the electrolyte in each system 18, 20 is substantially identical. As the cell stacks 14 are charged, the electrolyte in the anolyte flow system 18 becomes negatively charged and the electrolyte in the catholyte flow system becomes positively charged. As will be discussed in detail below, the battery system 10 is configured such that the polarity of the cell stacks 14 may be reversed. Consequently, each of the flow systems, 18 and 20, are interchangeable as the anolyte or catholyte flow system as a function of the polarity of the cell stacks 14.

A DC/DC converter housing 22 located within the cabinet 12 includes one or more DC/DC converters 24 that are operably connected to the cell stacks 14. A bus bar 28 is operatively connected to the DC/DC converters 24 and power may be passed bi-directionally between the cell stacks 14 and the bus bar 28 via the DC/DC converters 24. A heat exchanger 26 is disposed within the cabinet 12, and fans (not shown) may be affixed to fan mounts 27 on the cabinet 12. The battery system 10 also includes a controller 100 operatively connected to various components of the battery system 10, including the pumps 19 and the converters 24, among others.

Looking at FIGS. 5-9 the anolyte flow system 18 has a pump 19, piping 21, and a three way valve 30. Piping 21 leads from the portion of the tank assembly 16 in which the anolyte is held to the pump 19 for distribution of the anolyte to the cell stacks 14. The anolyte returns from the cell stacks 14 to the tank assembly 16 through additional piping 21 and can be diverted through the heat exchanger 26 by operation of the three way valve 30.

Referring now to FIGS. 10-13, the catholyte flow system 20 is formed similarly to the anolyte flow system 18 and also has a pump 19, piping 21, and a four way valve 32. Piping 21 leads from the portion of the tank assembly 16 in which the catholyte is held to the pump 19 for distribution of the catholyte to the cell stacks 14. The catholyte returns from the cell stacks 14 returns to the tank assembly 16 through additional piping 21 and flow direction through the stacks can be reversed by operation of the four way valve 32.

Referring next to FIGS. 22-25, the cell stack 14 is illustrated. The cell stack 14 is formed of a number of flow frames 34 disposed between a pair of end caps 36. Each of the flow frames 34 is molded to include half of the flow paths and other features on each side of the flow frame 34. A separator is included between each pair of flow frames 34 and adjacent flow frames 34 and separators are joined, for example by ultrasonic welding, vibration welding, or any other suitable joining method, to define flow paths between the flow frames 34. Each end cap 36 is molded to include the flow paths on one side of the end cap 36, which is oriented inward to the cell stack 14 such that the end cap 36 and the adjacent flow frame 34 similarly define a flow path. The other side of the end cap 36 is molded to include structural features of the cell stack 14 and to facility joining cell stacks 14 to each other.

With reference then to one side of each flow frame 34 and the internal facing sides of each end cap 36, the following features are molded into flow frames 34 and end caps 36. For reference, the features will be discussed with respect to one side of a flow frame 34, but are similarly applicable to both sides of the flow frame 34 and one side of the end cap 36. A flow frame 34 includes an upper edge 62, a lower edge 64, and a pair of side edges 66 extending between the upper and lower edges, 62 and 64 respectively. An opening 37 proximate to each of the corners of the flow frame 34 provides either an inlet/outlet for electrolyte entering/exiting the cell stack 14 or a fluid passage to conduct electrolyte between flow frames 34.

According to one embodiment of the invention, one of the openings 37 proximate to either the upper edge 62 or the lower edge 64 provides a fluid inlet and one of the openings 37 proximate to the opposite edge, 62 or 64, provides a fluid outlet for electrolyte passing over the electrode contained between each flow frame 34 and separator. The other opening 37 proximate to each of the upper and lower edges 62, 64 defines a channel allowing electrolyte to pass through a flow frame 34 or separator, but not be directed over the electrode contained therebetween. The openings 37 are configured such that electrolyte in the anolyte flow system 18 is directed down one side of the flow frame 34 and electrolyte in the catholyte flow system 20 is directed down the other side of the flow frame 34. The separator isolates the anolyte and the catholyte between adjacent flow frames 34. However, ion transfer may occur across the separator allowing current to flow in the cell stack 14. In this manner, the electrolyte flowing through the cell stack is divided into two flow paths to pass over electrodes on alternating sides of flow frames 34.

An internal header system 38 is defined proximate to each of the upper and lower edges, 62 and 64 respectively, to define flow channels for electrolyte distribution between flow frames 34. The internal header system 38 receives electrolyte from either the anolyte flow system 18 or the catholyte flow system and guides it through a first channel generally across the width of the flow frame 34 proximate to the upper edge 62. The internal header system 38 then guides the electrolyte through a return channel to a central portion of the flow frame 34. The electrolyte is subsequently divided into multiple flow paths at generally even spacing between each side 66 of the flow frame 34 to form flow channels for distribution of the electrolyte of the electrode. The internal header system 38 further includes an integrated filter 39 proximate to each of the inlet and outlet openings 37 to prevent large particles from entering and potentially blocking the flow paths in the header system 38. Mixing chevrons 41 are included in the flow channels to mix the multi-phase electrolyte into a continuous emulsion as it flows through the flow frame 34. The internal header system 38 both increases the electrolyte flow path, thereby increasing the internal resistance and reducing shunt currents flowing through the cell stack 14, and creates a more uniform distribution of electrolyte between flow frames 34.

According to the illustrated embodiment, the flow frame 34 further includes features used to join flow frames and separators to form a cell stack 14. Vibration weld beads 40 are molded into each flow frame 34. The vibration weld beads 40 are used to join flow frames 34 to assemble the cell stack 14 and to maintain rigidity of the cell stack 14 under pressure. The flow frames 34 also include flash traps to contain the flash generated during the vibration welding process. The flow frame or separator frame is made of insert or over molding materials and incorporates pins around the perimeter of the inserted part to push the insert to one side. This allows the complete flow frame 34 or separator frame to be completely assembled in the mold, eliminating many manual assembly operations. Welding alignment features 38, include, but are not limited to, the displayed pins and pin holes. Built-in visual inspection features ensure proper assembly, both prior to and following stack assembly.

Figure 23:
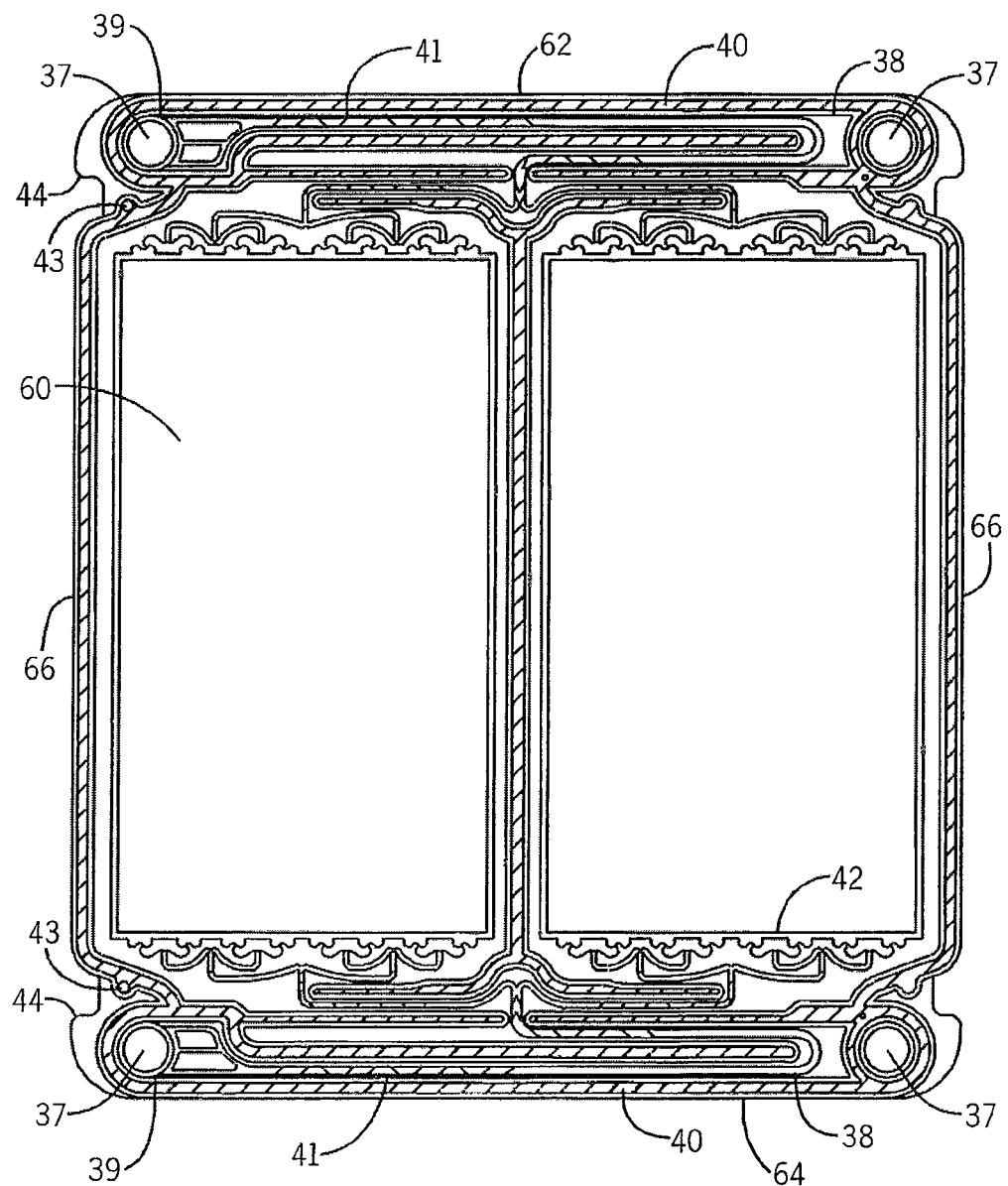
FIG. 23 is a front plan view of a flow frame employed in the cell stack of FIG. 22.
Figure 24:
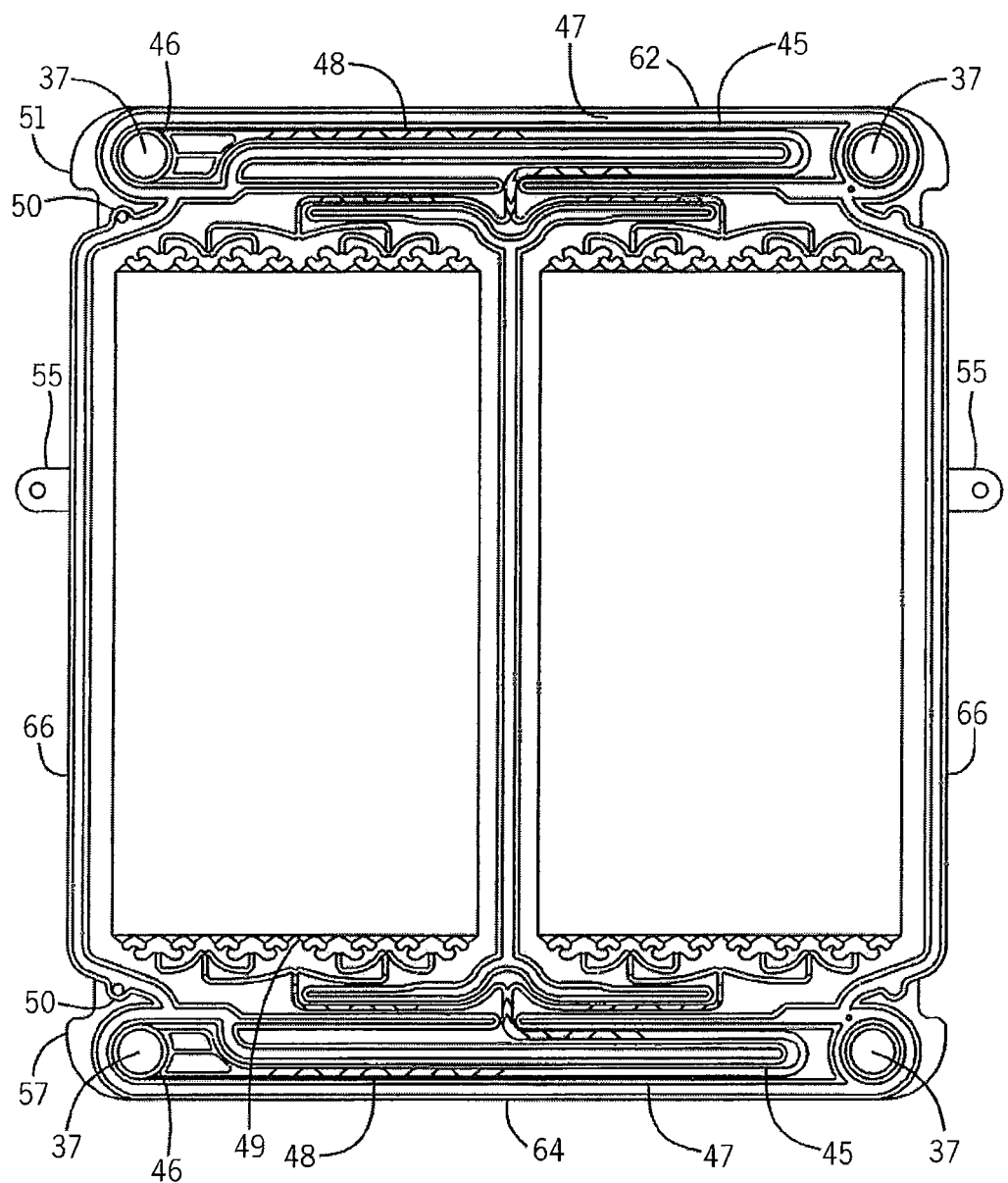
FIG. 24 is a front plan view of an end cap of the cell stack of FIG. 22.
Figure 25:
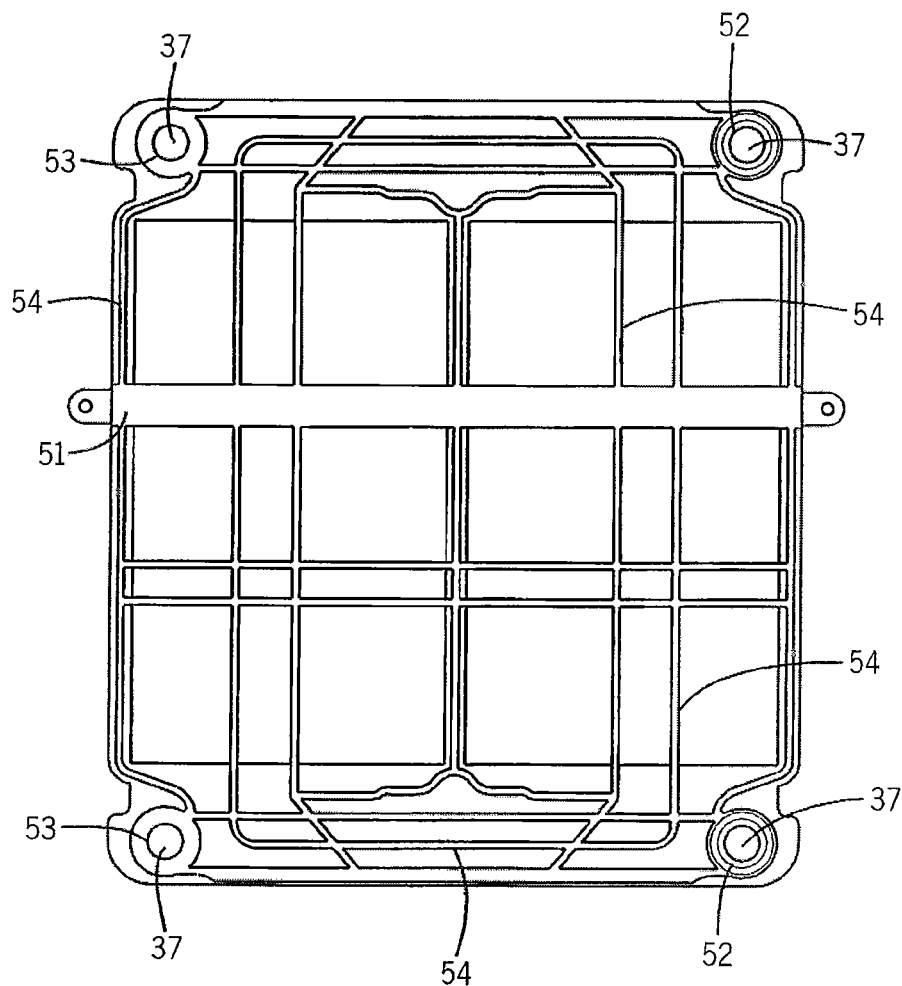
FIG. 25 is a rear plan view of a the end cap of FIG. 24.

Referring to FIGS. 23 and 24, the internal side of each end cap 36 is of similar construction to one side of the flow frame 34. The end cap 36 includes an internal header system 47 having an integrated filter 48 and mixing chevrons 50. The end cap 36 further includes construction elements such as the vibration weld beads 49, and built-in visual inspection features 53 to ensure proper assembly. The end caps 36 further include an o-ring groove on one corner and a solid surface on the opposite corner for sealing one stack to another. The end cap may be inserted or overmolded around the terminal electrode 55 for in mold assembly and a hermetically sealed battery stack 14, including materials and molding method incorporating pins around the perimeter of the inserted part to push the insert to one side The zinc bromine battery uses a spacer mesh material in each electrolyte half cell to maintain a constant cell gap thickness and to prevent the electrode and separator membrane from coming in contact with each other. The spacer needs to provide dimensional stability without preventing electrolyte flow through the flow channels.

Figure 26:
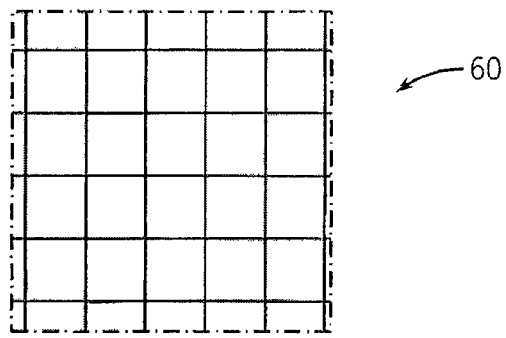
FIG. 26 is a partially broken away front plan view of a first embodiment of a spacer material utilized in the cell stack of FIG. 22.

In one embodiment shown in FIG. 26, the spacer design used a biaxially oriented polypropylene netting which is stretched in both directions under controlled conditions to produce strong, flexible, light weight netting.

Figure 27:
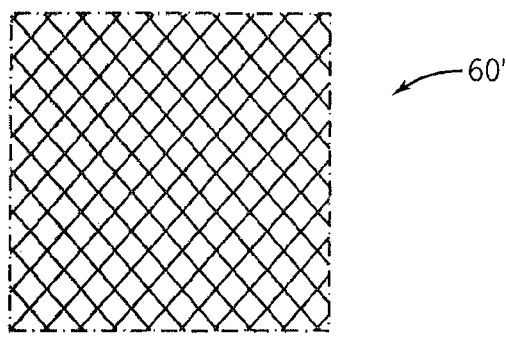
FIG. 27 is a partially broken away front plan view of a second embodiment of the spacer material of FIG. 26.
Figure 27A:
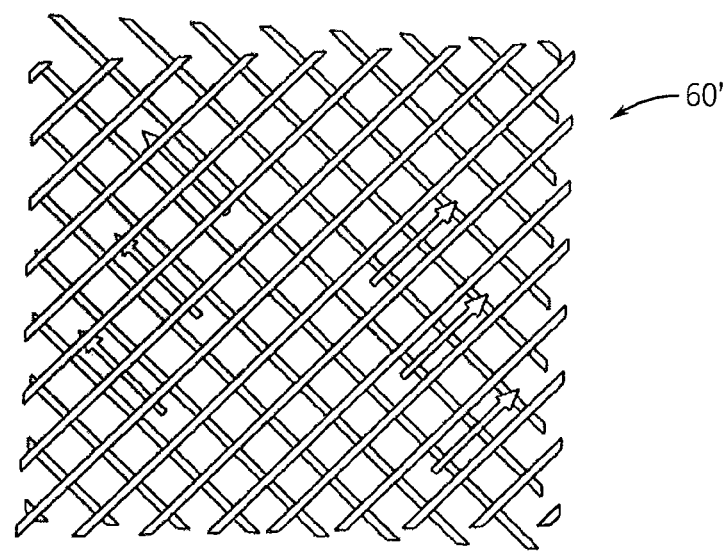
FIG. 27A is a partially broken away front plan view of the spacer material of FIG. 27.

In a second embodiment shown in FIGS. 27 and 27A, extruded netting produced in a diamond (bi-planar) configuration provides improved battery performance. Flow tests showed improved distribution of the bromine electrolyte across the face of the electrode, and battery performance testing also showed a significant improvement in current distribution between half stacks which in turn provided improved energy efficiency.

The battery system 10 uses a bi-planar polypropylene mesh to improve the consistency of the cell gap and distribution of electrolyte and Bromine over the active cell area. The mesh consists of two layers of parallel strands, where the strands in each layer are disposed at angles with respect to one another, e.g., are oriented perpendicular to each other. Further, the mesh can be orientated in the cell so that each layer of strands is at an angle with respect to the electrolyte flow direction, e.g. at an angle of 45 degrees to the electrolyte flow direction.

According to one embodiment of the invention, a separate DC/DC converter 24 individually operates and controls each cell stack 14 in the flow battery system 10. Previous tests have shown that cell stacks 14 can be operated individually without affecting the performance of the remaining cell stacks 14. Also, when cell stacks 14 are connected electrically in parallel, the cell stacks 14 will operate at a common DC voltage, but the current delivered from or accepted by each cell stack 14 can vary significantly to maintain the common DC voltage on each stack. Further, by providing separate DC/DC converters 24 for each cell stack 14, one cell stack 14 may be stripped while the remaining cell stacks 14 remain operational in the standard charge/discharge configuration.

According to one embodiment of the invention, the battery system 10 is equipped with eight (8) cell stacks 14 each independently connected to a DC/DC converter 24. This structure allows the module 10 to optimize energy flow to individual cell stacks 14 using the DC bus voltage as a set point to charge and discharge. One example of this structure is illustrated in co-pending U.S. patent application Ser. No. 13/185,862, incorporated herein by reference in its entirety. This application discusses a hysteretic control method by which power is transferred in a bidirectional manner between the DC bus 28 and each cell stack 14 via the corresponding DC/DC converter 24. Each DC/DC converter 24 includes separate set points at which the cell stack 14 is charged or discharged. For example, stacks with a lower state of charge may have their DC/DC converters 24 set to charge at a lower DC bus set-point (e.g., 351 V) while stacks with a higher state of charge may have their DC/DC converters 24 set to charge at a higher DC bus set point (e.g., 355 V). Thus, energy on the DC bus 28 gets stored first in the cell stacks 14 with a lower state of charge. The set points may similarly be staggered for discharging cell stacks 14. Cell stacks 14 with a high state of charge may have their DC/DC converters 24 set to discharge at a higher DC bus set point (e.g., 330 V) while cell stacks 14 with a lower state of charge may have their DC/DC converters 24 set to discharge at a lower DC bus set point (e.g., 325 V). Thus, energy is supplied to the DC bus 28 first from the cell stacks 14 with a higher state of charge. It is further contemplated that one DC/DC converter 24 may be connected to two or more cell stacks 14. Multiple cell stacks 14 may be connected in series, in parallel, or a combination thereof, resulting in an energy storage device having a desired voltage and energy storage capacity. The set of cell stacks 14 connected to the DC/DC converter 24 is controlled in a similar manner as the individual cell stacks 14 discussed above.

According to another aspect of the invention, the DC/DC converter 24 is configured to operate with either polarity present at the cell stack 14. In a first operating mode polarity at the cell stack 14 is the same as the polarity at the DC bus 28. In a second operating mode, the polarity at the cell stack 14 is reversed from the polarity at the DC bus 28.

Figure 29:
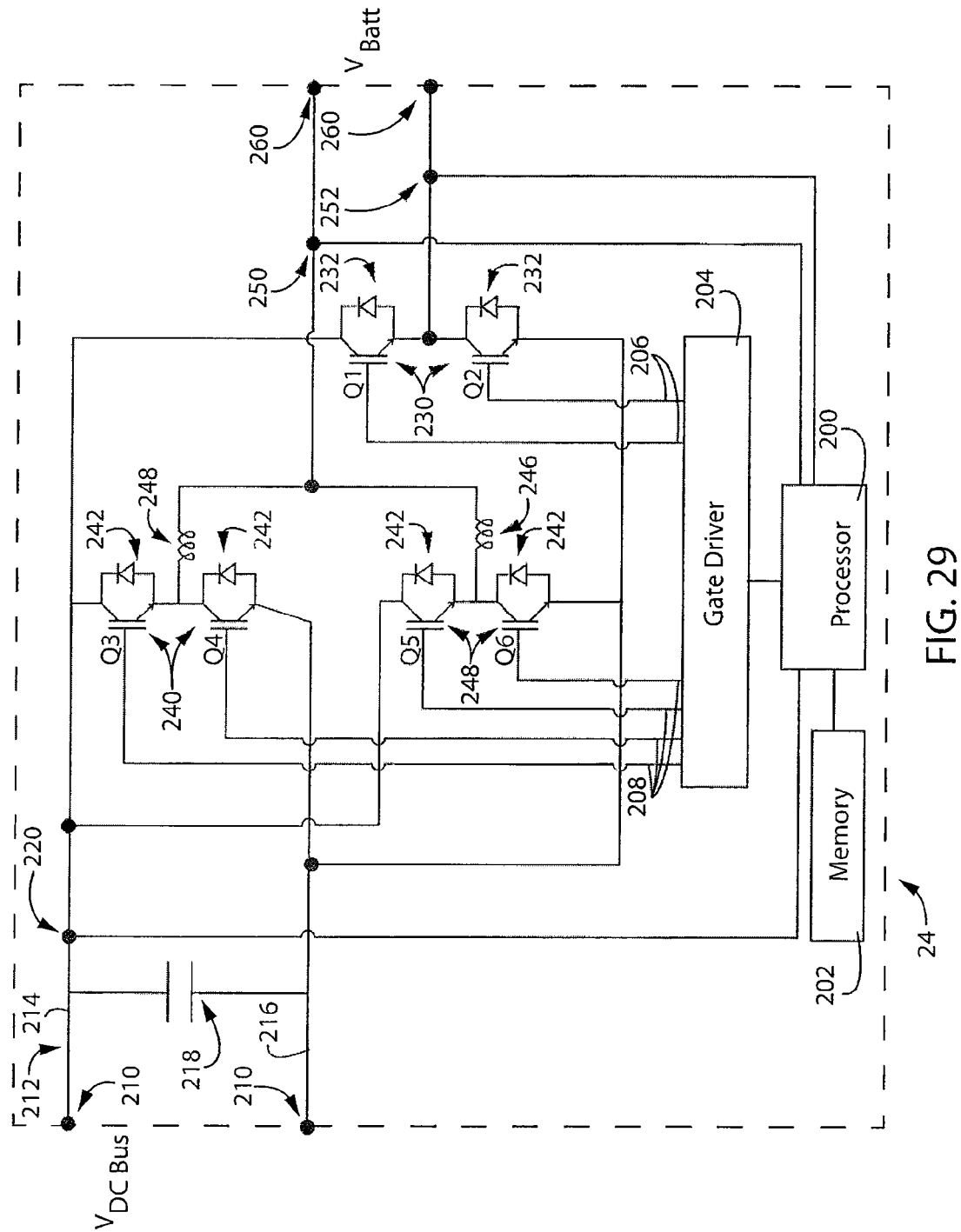
FIG. 29 is a schematic representation of one embodiment of a DC/DC converter for use in the module of FIG. 1.
Figure 30:
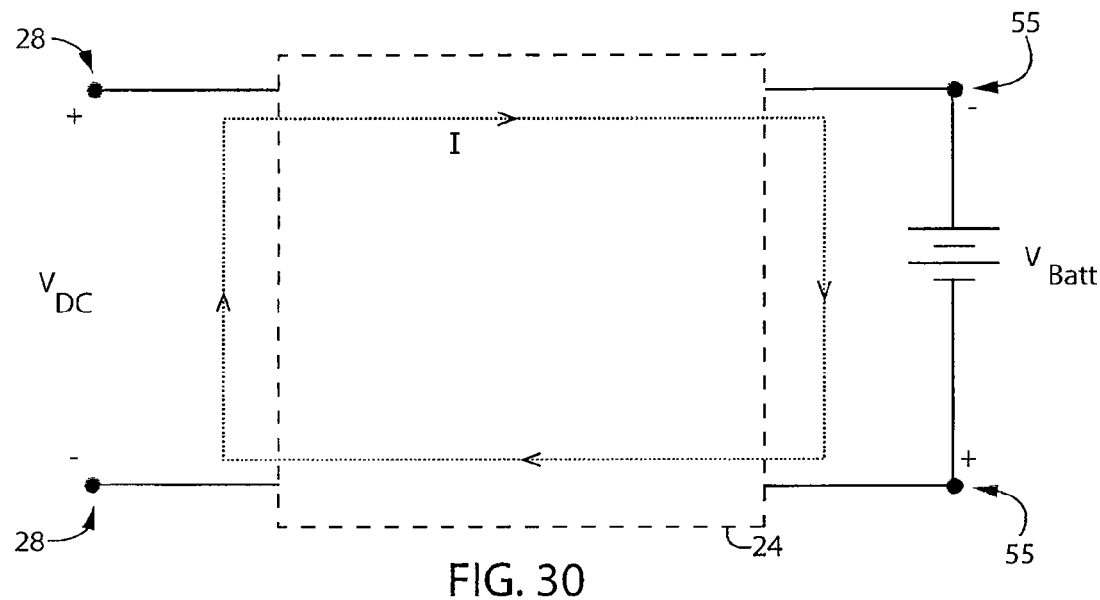
FIG. 30 is a block diagram representation of a first operating mode of the DC/DC converter of FIG. 29.
Figure 31:
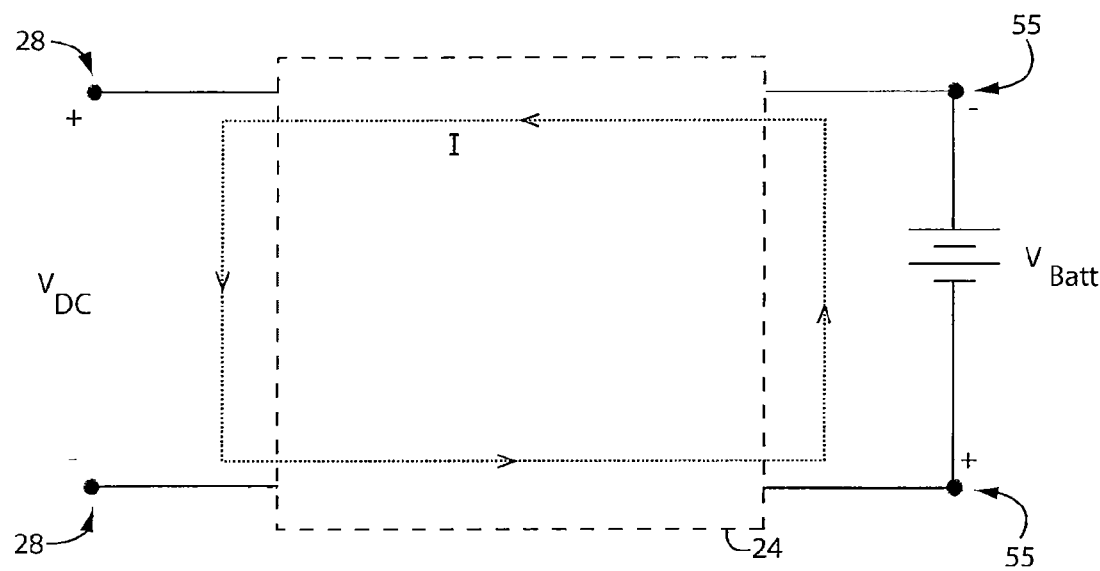
FIG. 31 is a block diagram representation of a second operating mode of the DC/DC converter of FIG. 29.
Figure 32:
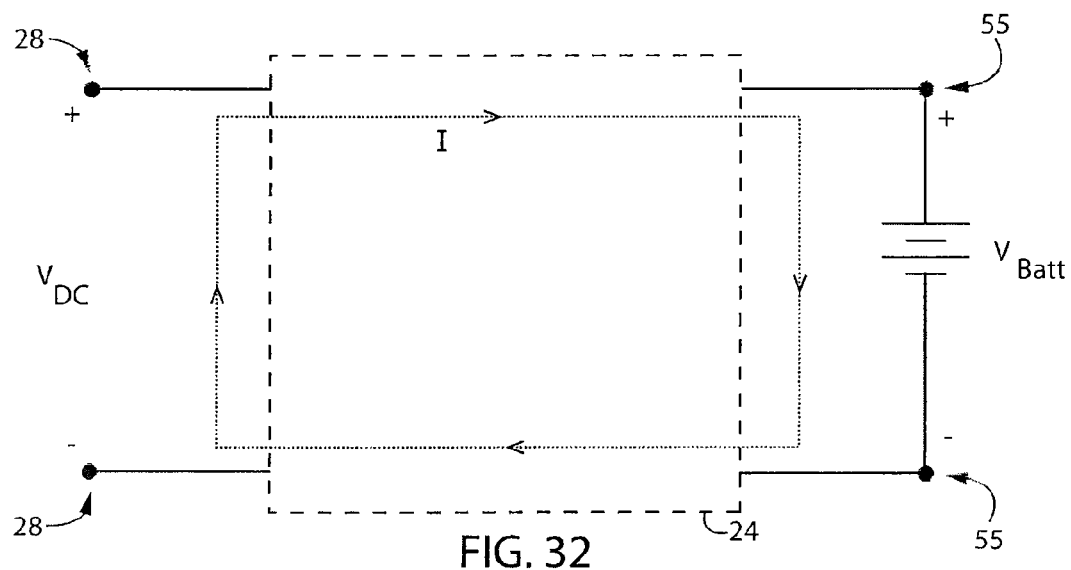
FIG. 32 is a block diagram representation of a third operating mode of the DC/DC converter of FIG. 29.
Figure 33:
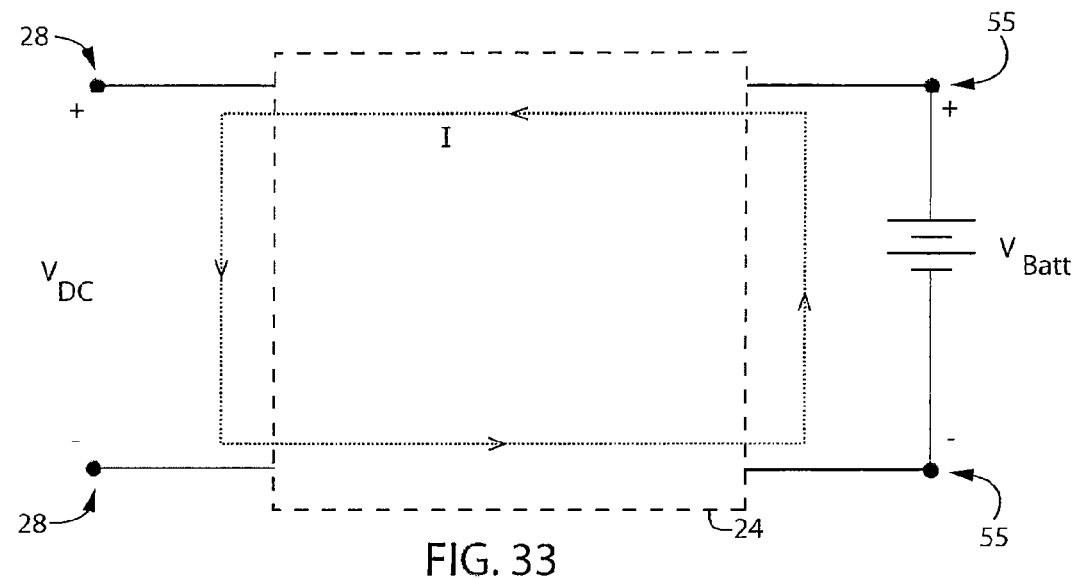
FIG. 33 is a block diagram representation of a fourth operating mode of the DC/DC converter of FIG. 29.

Referring next to FIG. 29, an exemplary polarity reversing DC/DC converter 24 is illustrated. The DC/DC converter includes a processor 200 in communication with a memory device 202. The processor 200 may be, but is not limited to, a microprocessor, a field programmable gate array (FPGA), an application specific integrated circuit (ASIC), a logic circuit, or any combination thereof, and may further include one or more of the aforementioned devices operating in series or in parallel. The memory device 202 may similarly be implemented in a single device or multiple devices and may include static memory, dynamic memory, or a combination thereof. The memory device 202 is configured to store, for example, operating parameters and programs, or a series of instructions executable by the processor 200. The processor 204 is further in communication with a gate driver 204. The gate driver 204 may be, but is not limited to a microprocessor, a field programmable gate array (FPGA), an application specific integrated circuit (ASIC), a logic circuit, and may also be integrated into a single device with the processor 200. The processor 200 receives feedback signals from sensors corresponding to the amplitude of the voltage and/or current at various points throughout the DC/DC converter 24. The locations are dependent on the specific control routines being executed within the processor 200. For example, DC bus sensors 200 may provide an amplitude of the voltage present on the DC bus 212. Optionally, a DC bus sensor 200 may be operatively connected to provide an amplitude of the current conducted on a DC bus 214 internal to the DC/DC converter 24. Similarly a current and/or a voltage sensor, 250 and 252, may be operatively connected to provide an amplitude of the current and/or voltage at a cell stack 14 connected to the DC/DC converter 24.

The DC/DC converter 24 further includes a pair of input terminals 210 configured to be connected to the DC bus 28 of the battery system 10. Each terminal 210 is then connected to the internal DC bus 212 within the DC/DC converter 24. The internal DC bus 212 includes a positive rail 214 and a negative rail 216. As is understood in the art, the positive rail 214 and the negative rail 216 may conduct any suitable DC voltage potential with respect to a common or neutral voltage and are not limited to a positive or a negative DC voltage potential. Further, either of the positive rail 214 or the negative rail 216 may be connected to a neutral voltage potential. The positive rail 214 typically conducts a DC voltage having a greater potential than the negative rail 216. A capacitance 218 is connected between the positive rail 214 and the negative rail 216 of the internal DC bus 212. The capacitance 218 may be a single capacitor or any number of capacitors connected in series or parallel according to the system requirements.

A plurality of switching devices 230, 240 selectively connect the internal DC bus 212 to the output terminals 260. The switching devices 230, 240 are typically solid-state power devices, including, but not limited to, bipolar junction transistors (BJTs), field effect transistors (FETs), thyristors, or silicon controlled rectifiers (SCRs). Optionally, the switching devices 230, 240 may be electro-mechanical devices or any other suitable switching device configured according to the application requirements. A diode 232, 242 is connected in parallel to each of the switching devices 230, 240 for reverse conduction across the switching device 230, 240 as required when the switching device 230, 240 is turned off. A first set of switching devices 230 is used to control the polarity of the voltage at the output terminals 260. Each of the first set of switching devices 230 receives one of the corresponding first set of gating signals 206. A second set of switching devices 240 is used to regulate the amplitude and direction of the current between the internal DC bus 212 and the output terminals 260. Each of the second set of switching devices 240 receives one of the corresponding second set of gating signals 208. Inductors 246 and 248 are included in series between the second set of switching devices 240 and the output terminals 260 to facilitate regulation of the current between the internal DC bus 212 and the output terminals 260.

In operation, the DC/DC converter 24 is configured to regulate bidirectional current flow between the DC bus 28 and one or more cell stacks 14 connected to the DC/DC converter 24. The DC/DC converter 24 is also configured to connect to the cell stack 14 in either a forward or a reverse polarity with respect to the DC bus 28 and to switch between polarities of the cell stack 14 while maintaining a constant polarity at the connection to the DC bus 28. Referring again to FIG. 29, the processor 200 is configured to execute a series of instructions stored in the memory device 202. The processor 200 generates reference signals to the gate driver 204 which, in turn, generates gating signals 206, 208 to control operation of the switching devices 230, 240. Optionally, the gate driver 204 is integrated in the processor 200 and the processor 200 is further configured to generate the gating signals 206, 208.

According to the illustrated embodiment, the first set of gating signals 206 control operation of the first set of switching devices 230, and the first set of switching devices 230 is configured to control the polarity of the voltage at the output terminals 260. The first set of switching devices 230 are configured such that only one of transistor one, Q1, or transistor two, Q2, is enabled at a time. When transistor one, Q1, is enabled, the polarity of the output terminals 260 is reversed with respect to the polarity of the DC bus 212. When transistor two, Q2, is enabled, the polarity of the output terminals 260 is the same as the polarity of the DC bus 212.

The second set of gating signals 208 control operation of the second set of switching devices 240, and the second set of switching devices 240 is configured to control the current between the DC bus 212 and the output terminals 260. As illustrated, two pairs of the second set of switching devices 240 are included. The first pair includes transistor three, Q3, and transistor four, Q4; and the second pair includes transistor five, Q5, and transistor six, Q6. Optionally, a single pair of the second set of switching devices 240 may be included. When transistor one, Q1, is enabled such that polarity of the output terminals 260 are of opposite polarity to the DC bus 212, toggling of transistors four and six, Q4 and Q6 respectively, operate to charge the cell stack 14 connected to the DC/DC converter 24. Conversely, when transistor one, Q1, is enabled such that polarity of the output terminals 260 are of opposite polarity to the DC bus 212, toggling of transistors three and five, Q3 and Q5 respectively, operate to discharge the cell stack 14 connected to the DC/DC converter 24. When transistor two, Q2, is enabled such that polarity of the output terminals 260 are of the same polarity as the DC bus 212, toggling of transistors three and five, Q3 and Q5 respectively, operate to charge the cell stack 14 connected to the DC/DC converter 24. Conversely, when transistor two, Q2, is enabled such that polarity of the output terminals 260 are of the same polarity as the DC bus 212, toggling of transistors four and six, Q4 and Q6 respectively, operate to discharge the cell stack 14 connected to the DC/DC converter 24. It is further contemplated the switching devices 230, 240 may be controlled in varying combinations and according to varying control routines to control the polarity of the voltage at the output terminals 260 and to charge/discharge the cell stack 14.

Referring also to FIGS. 30-33, operation of the power converter 24 while charging and discharging with both forward and reverse voltage polarities present at the battery terminals 55 is disclosed. During standard operation (i.e. other than equalization or stripping of a cell stack 14), the processor 204 retrieves the voltage set points from the memory device 202 at which the DC/DC converter 24 is to either charge or discharge the cell stack 14. The DC/DC converter 24 operates according to either FIGS. 30 and 31 or FIGS. 32 and 33 according to the polarity presently commanded at the battery terminals 55. If a polarity reversal is commanded, the DC/DC converter 24 fully discharges the cell stack 14, reverses the polarity of the voltage applied to the cell stack 14, and begins recharging the cell stack 14. The DC/DC converter 24 then resumes standard operation according to either FIGS. 30 and 31 or FIGS. 32 and 33 as required by the new polarity presently commanded at the battery terminals 55.

While the DC/DC converter 24 is executing under standard operation, the processor 200 maintains a record of operation. Optionally, the module controller 100 maintains a record of operation of each of the DC/DC converters 24 and commands the desired operating modes of each DC/DC converter 24 as a function of the duration of operation. After a predetermined interval, the DC/DC converter 24 enters a cell equalization routine. The cell equalization process is required to prevent the formation of destructive zinc dendrites in the cell stack 14.

According to one embodiment of the invention, a point system is utilized to track operation of the DC/DC converter 24. Either the DC/DC converter 24 or the module controller 100 monitors the current flowing between the DC bus 28 and the cell stack 14 and other operating conditions as a means of forecasting the health of each particular cell stack 14 in the battery system 10. The current and other monitored conditions are converted into an integer value, or points. When the sum of these points reaches a user determined maximum value, the DC/DC converter 24 is commanded to enter a discharge only mode and begin the cell equalization process. Monitored conditions may include, but are not limited to, factors such as the total charge and discharge (amp hours) of the cell stack 14, the rate of charge and discharge of the cell stack 14, and the number of times the cell stack 14 has been cycled from a charged condition to a discharged condition between strip cycles. The module controller 100 may further limit the number of cell stacks 14 entering an equalization routine at one time such that a minimum storage capacity is maintained. Consequently, the number of points accumulated by a DC/DC converter 24 may vary upon entering the equalization routine. This number of points may be used to determine the type of strip cycle and length of time the cell stack 14 will be in a strip cycle. By tracking cell stack 14 usage, only those cell stacks 14 requiring equalization are commanded to enter the equalization routine rather than conducting a strip of the entire battery system 10, optimizing overall system availability. Optionally, the DC/DC converter may be commanded to enter a strip cycle based solely on the operating time. It is further contemplated that still other methods of tracking duration of the charging/discharging cycles in the cell stack 14 may be utilized without deviating from the scope of the invention.

Figure 34:
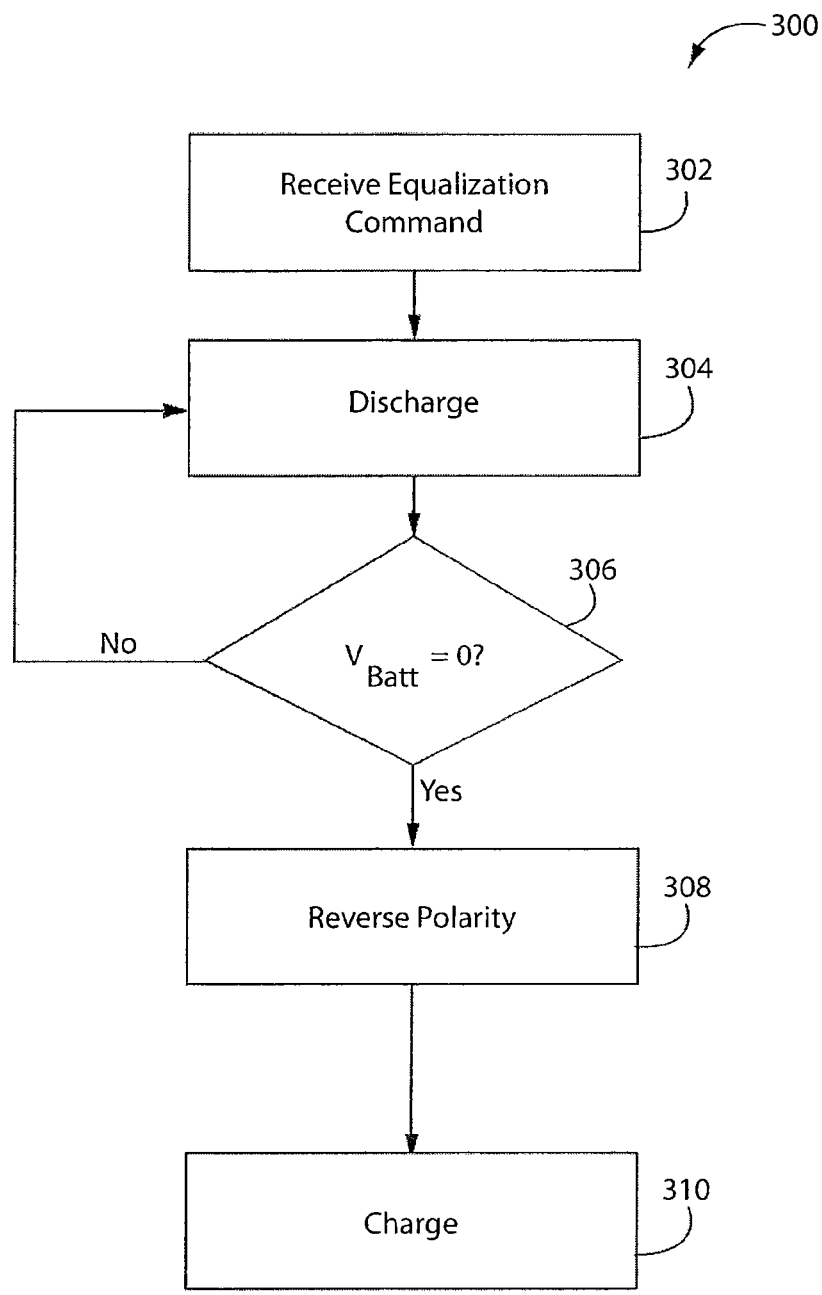
FIG. 34 is a flowchart illustrating operation of the DC/DC converter of FIG. 29.

Referring next to FIG. 34, the steps in an improved equalization routine 300 are illustrated. At step 302, the DC/DC converter 24 receives a command to enter the equalization routine. The command may be generated internally as a function of monitoring operation of the charge/discharge cycles of the connected cell stack 14. Optionally, the command may be received from the module controller 100. The DC/DC converter 24 enters the discharge mode, for example, by changing the set points for the hysteretic control. If the discharge set point of the hysteretic control is set to a value greater than the desired value of the voltage on the DC bus 28, the DC/DC converter 24 begins discharging its respective cell stack 14 to the DC bus 28. Either a load present on the DC bus 28 or the remaining cell stacks 14 draw the energy from the DC bus 28 to maintain the desired voltage level on the DC bus 28. At step 306, the equalization routine continues to loop back to the discharge step 304 until the DC/DC converter 24 has discharged its respective cell stack 14 and the voltage present on the battery has reached zero volts. Upon reaching zero volts, the DC/DC converter 24 reverses the polarity present on the battery terminals 55, as shown in step 308. The DC/DC converter 24 then begins charging the cell stack 14 with the reversed polarity present at the battery terminals 55. Because the equalization routine 300 is not concerned with cell reversal, discharge of the cell stack 14 may continue at a rapid rate down to zero volts rather than requiring discharge to occur at continuously reduced steps of current.

Figure 35:
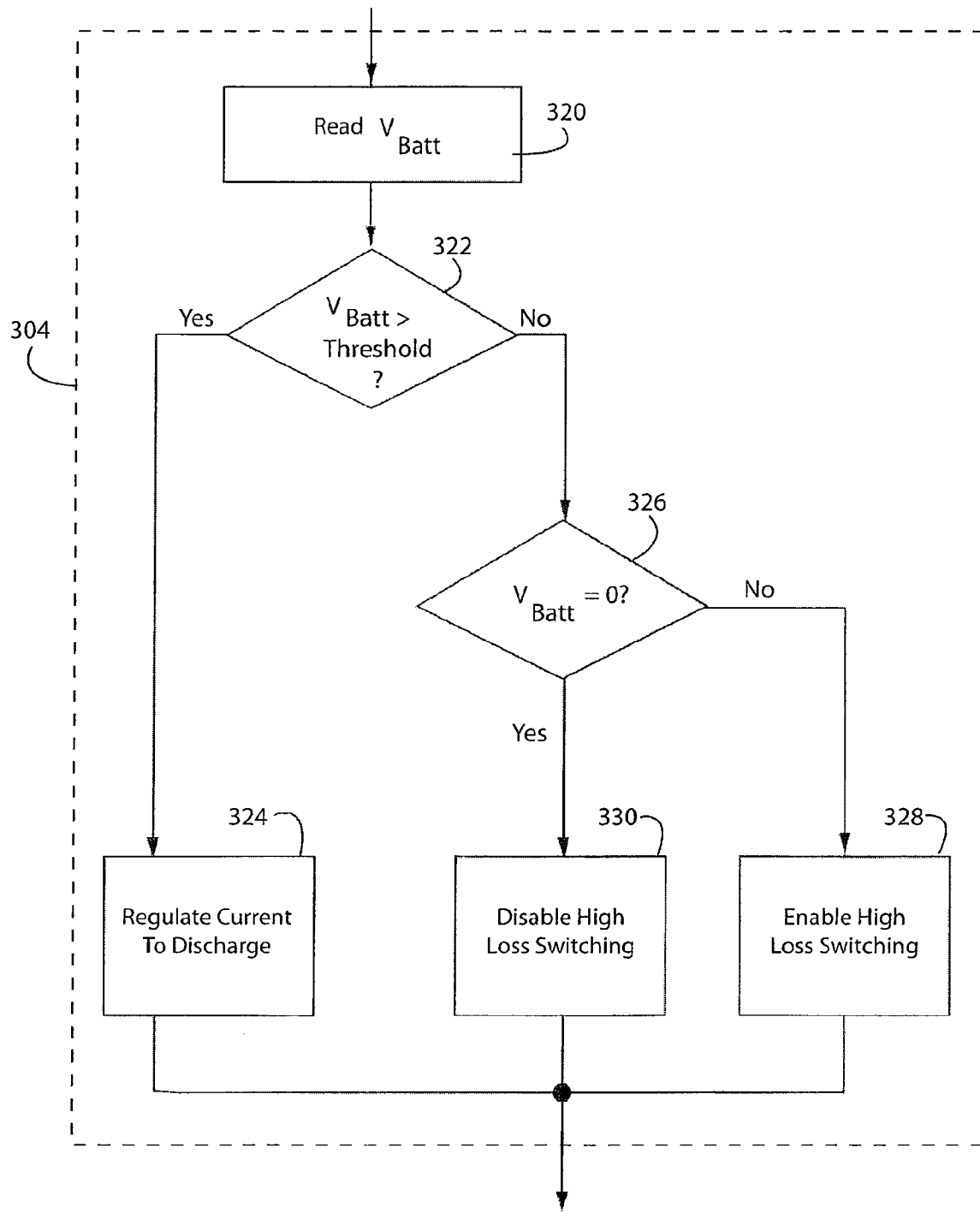
FIG. 35 is a flowchart illustrating the discharge step of the flowchart of FIG. 34.

Referring next to FIG. 35, discharge step 304, of the equalization routine 300 is illustrated in more detail. During discharge, the DC/DC converter 24 monitors the amplitude of the voltage present at the cell stack 14, as shown in step 320. At step 322, the amplitude of the voltage is compared against an initial threshold. If the amplitude of the voltage is greater than the initial threshold, the DC/DC converter 24 continues to regulate the current from the cell stack 14 to the DC bus 28, discharging the cell stack 14, as shown in step 324. If the amplitude of the voltage drops below the initial threshold, the discharge routine checks if the amplitude of the voltage has reached zero volts at step 326. While the amplitude of the voltage remains below the initial threshold but greater than zero volts, a high loss switching module is enabled, as shown in step 328. When the amplitude of the voltage reaches zero volts, the high loss switching module is disabled, as shown in step 330. Thus, the DC/DC converter 24 is operable to automatically reverse the polarity of the voltage present at the output terminals 260 connected to the cell stack 14 while maintaining the polarity on the input terminals 210 connected to the DC bus 28 and while continuously regulating the DC current in a bi-directional way. This ability to reverse the polarity of the voltage at the cell stack 14 accelerates cell equalization of the flow battery and allows reverse charging of the flow battery module while maintaining a common polarity as seen by the rest of the battery system 10 at the input of the DC/DC converter 24.

Figure 36:
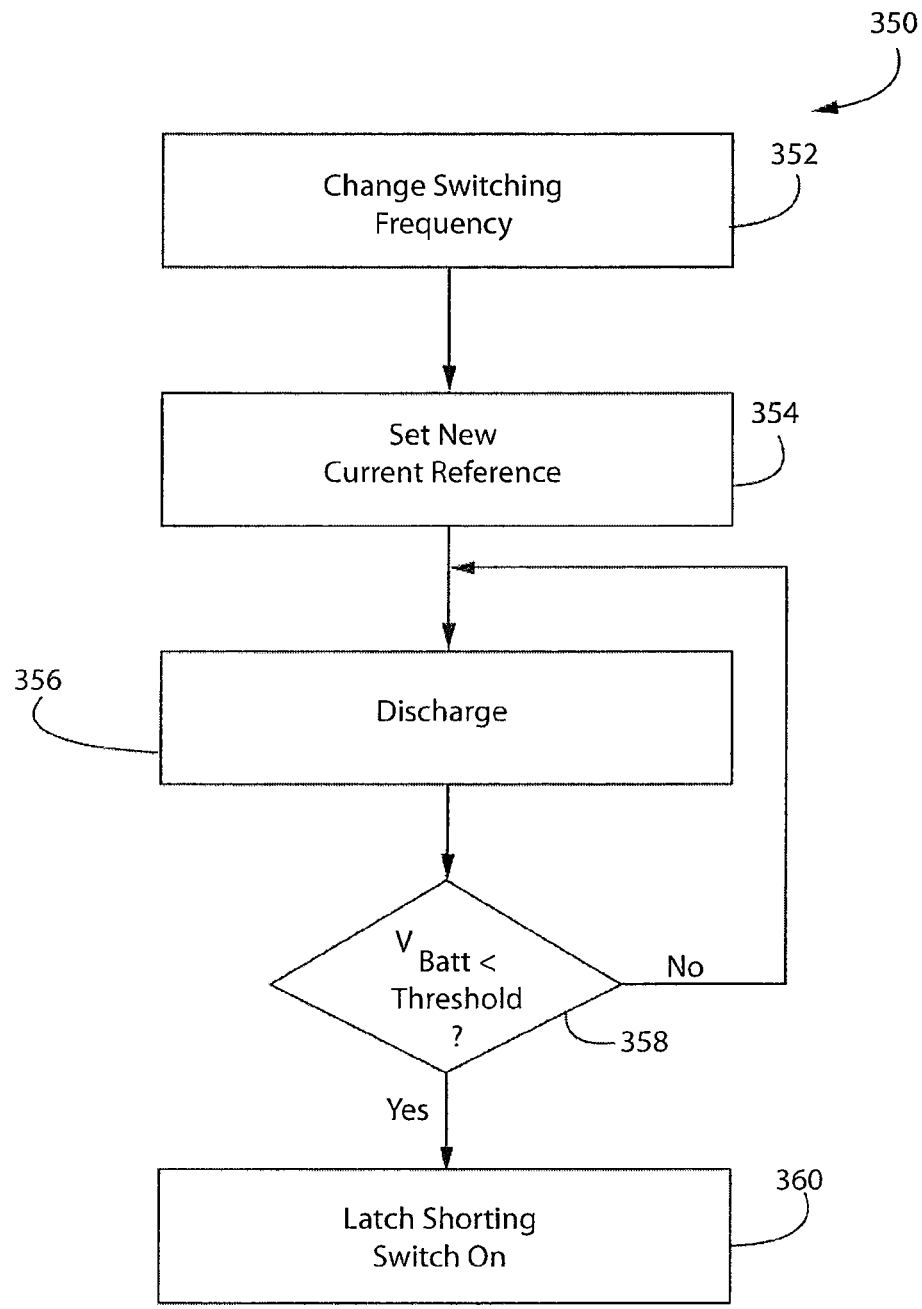
FIG. 36 is a flowchart illustrating the high loss switching operation for the flowchart of FIG. 34.

Referring next to FIG. 36, the high loss switching module 350 controls the switching frequency of the modulation routine, as shown in step 352, generating the gating signals 206, 208 of the switching devices 230, 240 (see FIG. 29) to function as an "active resistor". In contrast to traditional discharge methods, in which resistors are connected across which energy may be dissipated, the high loss switching module 350 causes energy to be dissipated in the switching devices 230, 240. By increasing the switching frequency of the modulation routine, the switching devices 230, 240 are turned on/off more frequently resulting in an increase in losses associated with said switching. By waiting until the voltage at the battery terminals 55 has dropped below an initial threshold, the voltage and consequently the power across the switching devices 230, 240 is reduced. The current reference may also be reduced at step 354, thereby further reducing the power dissipated across each transition of the switching devices 230, 240.

As an additional advantage, the switching frequency may be linearly varied between the normal operating frequency and an upper limit. According to one embodiment of the invention, the switching frequency may be increased between 4 and 16 times the original switching frequency used by the DC/DC converter 24. In contrast, traditional connection of resistors results in a single resistance or a series of stepped resistances, resulting in finite steps of current drawn from the cell stack 14 as it is discharged. Although, shown in FIG. 36 as returning from block 358 to the discharge block 356, the high loss switching module 350 may be configured such that it returns from block 358 to the change switching frequency block 352 and a continuously variable switching frequency may be implemented. At step 356, the high loss switching module 350 operates at the selected switching frequency and current reference to discharge the cell stack 14. The voltage level across the cell stack 14 is monitored at step 358. When the voltage level across the cell stack 14 has dropped below a lower, second threshold, one or more of the switching devices may be latched on, generating a short circuit to fully discharge the cell stack 14. The internal resistance of the cell stack 14 limits the current under this short circuit operating condition. By acting as an active resistance, the high loss switching module 350 provides a method of equalizing the cell with a resistive approach which is linearly variable across a broad operating frequency in contrast to the typically fixed passive resistive scheme. The DC/DC converter 24 has the capability of strategically implementing the polarity reversal, the high loss switching module 350, or both with full flexibility in range settings of each.

Although the invention has been discussed with respect to the DC/DC converter 24 illustrated in FIG. 29, it is further contemplated that numerous other configurations of power converters may be employed without deviating from the scope of the invention as long as the power converter is configured to regulate bidirectional current flow between the DC bus 212 and the output terminals 260 and to control the polarity of the voltage at the output terminals 260.

The following are further descriptions of the various attributes of the components of the module 10 and for the operation of the module 10.

Module Electrolyte tanks 16—Complexed Bromine Storage, Control and Level Management.

Design involves using three separate tanks 16 all connected at the top for overflow protection. Tank levels are controlled through pump speeds and differential head pressure due to the fluid height in the tanks. Tanks are rotational molded with recessed areas for pumps and plumbing.

Battery Cell and Flow Frame Design—gives Consistent Flow Distribution under a very Wide Range of Fluid Parameters. Efficient and Suitable for other Flow Battery Chemistries.

There are some approaches applied in the flow frame 34 plenum to achieve 2P distribution (i.e., a two (2) parameter distribution function) through successive bifurcations. A solution has been designed that achieves even horizontal flow rates and sufficient turbidity at each bifurcation to evenly distribute single or multi-phase fluids.

Battery State-of-Charge Indicator

Figure 28:
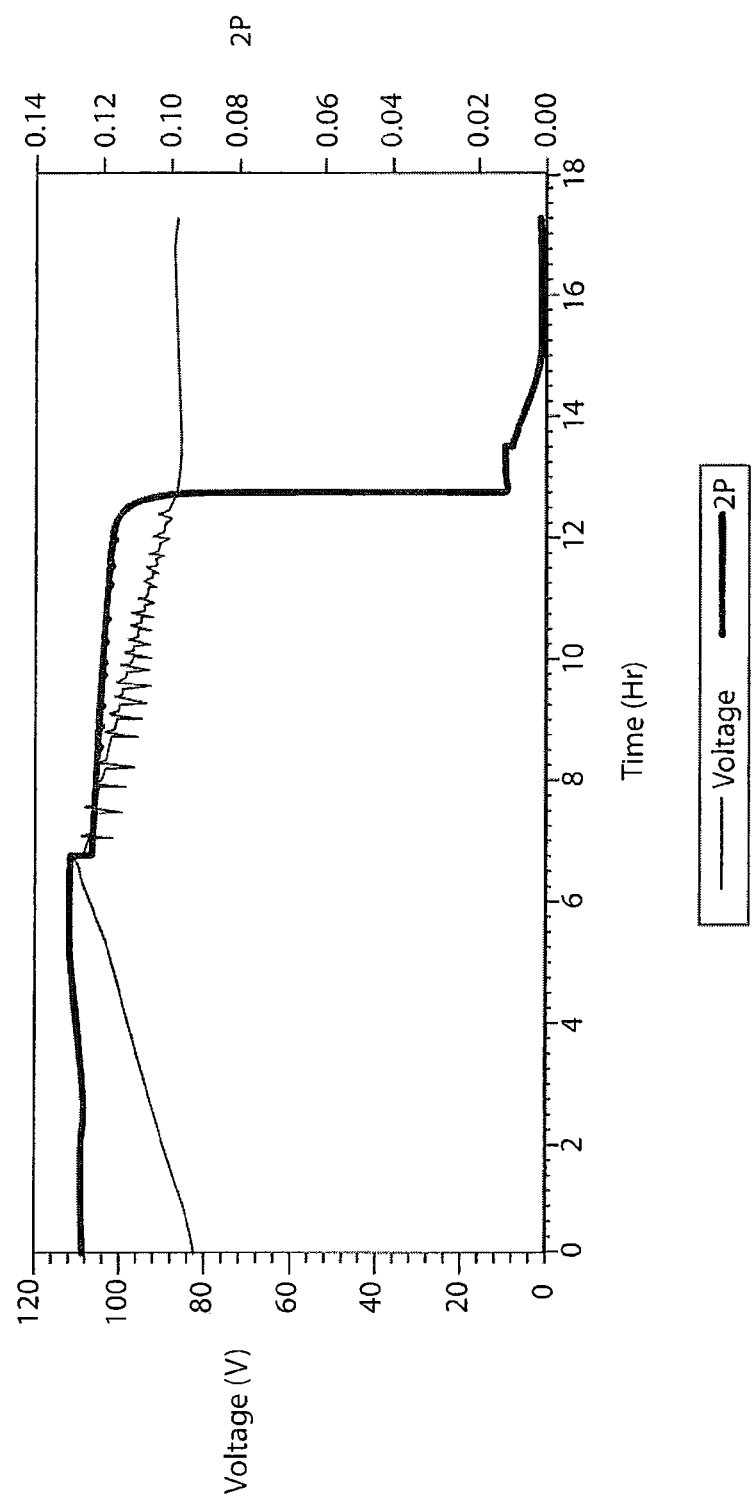
FIG. 28 is a graphical representation of the measurement of the state of charge of the module of FIG. 1.

The 2P tank bottom pressure is logged using a submerged pressure transducer. Referring to FIG. 28, as 2P builds during charge (starts settling at ~1 h, 100 A over 3 stacks) the pressure increases as a linear function and therefore proportional to the SOC. During discharge the 4 WV turns every 5-15 min and causes a 2P build-up in the stacks with rapid 2P level drop-off.

Measuring battery SOC by measuring electrolyte pressure in an electrolyte storage tank for a flow battery is the object of this invention. To record a change in electrolyte density by logging tank pressure is perhaps new, and can be accomplished through a separate storage tank for the bromine phase in a zinc bromine flow battery.

Module Electrolyte Flow Control for Maximum Efficiency, Long Term Shut Down and De-Gassing Procedures The module controller 100 is designed to control the flow system, thermal management and protections, and monitoring all aspects of the module. The module controller 100 monitors eight (8) cell stacks to determine what mode the hardware should be in. For example, if any one stack is discharging, the module will open the 2nd phase valve for discharge. The module controller also maintains the battery temperature using a system of fans and heat exchangers. Faults and system messages are also handled. For example, if the module has a hardware fault, the controller takes the appropriate action to safely shutdown the battery and to notify the system controller of the fault. The module controller manages the stripping function and all modes of operation.

A shut down procedure has been developed to rinse the bromine rich second phase from the cell stacks so that the battery can be left in a partially charged state indefinitely. The 2P tank plays an integral role in this procedure as contains features that separate the Bromine and aqueous phases, leaving the Bromine stored in the 2P tank for controlled dispatch. During the shutdown procedure, the 4-way valve 32 is rotated into the forward (top to bottom of stack) position, the second phase valve is closed to minimize the amount of bromine going to the cell stacks, the pumps 19 are operated at reduced speed or pulsed to circulate electrolyte through the stacks and purge the Bromine phase. The battery is then discharged to remove any remaining reactive chemicals in the cell stack. Once the battery reaches a safe voltage, the pumps are stopped and the battery will be able to remain in this state indefinitely.

Module Thermal Management and Regulation using Specialty Heat Exchangers 26

To prevent the electrolyte temperature from exceeding the allowable operating range, the anolyte is directly cooled on the battery module using an Air Cooled Heat Exchanger 26. To resist the corrosive electrolyte the tube side of this heat exchanger is made using a high purity Titanium material. The air side of this heat exchanger uses Aluminum fins and ambient air is fan forced through this exchanger to provide the cooling. This exchanger 26 is also electrically isolated so that it floats at the electrolyte voltage and there are no leakage currents that would accelerate corrosion.

Dual (AC/DC) Power Supply

A single device utilized to provide control and/or aux power where the source of the power is derived from redundant sources. Where the power supply utilizes the high voltage regulated DC bus voltage of a battery module output and/or PECC common DC Bus and the AC source from the AC side of an inverter in the PECC system or external AC source. Thus providing the capability of a fully operational system with or without a connected AC source such as the utility grid and where the primary/preferred source is established as the DC input for the purpose of utilizing priority renewable energy generation when possible, as it is connected to the DC bus, and only utilizing the Grid source when not available. The dual power supply remains completely seamless to the control/aux output. The device is such that it may have multiple source inputs for desired redundancy and provide one or more outputs.

Use Common DC Bus 28 to Power Auxiliaries.

A single all inclusive device (Auxiliary Power & Control Module (APC)) which provides multiple regulated & isolated DC voltages for aux power of flow battery devices (pumps, controllers, fans, heater etc) and controls, & inclusive of a complete DSP based controls to all auxiliary equipments & instruments as well as flow battery charging and discharging controls in a flow battery, or in essence everything a flow battery requires to operate. Additionally, the device includes external communication to provide set up and control as well as complete monitoring of all aspects both mechanical and electrical in the flow battery. The Device (Aux Power & Control Module) shall be packaged on a single board with mounting standoffs, power, i/o's & communication. And where the device derives its source from a common regulated DC bus at the output of the flow battery module or other energy storage devices or sources that may be connected to the common dc bus, such as the PECC common bus. Resulting in a self sustaining flow battery module even in the event of an absent alternative generation source. Significance is that all environmental and operational functionality may be maintained as long as energy is stored and available from the flow battery itself and not reliant upon any external or indirect source to operate and control the flow battery.

Method and Materials for Overmolding Battery Components

In the battery stack 14 the membranes, electrodes and Terminal Electrodes (TE's) are insert molded into the their respective "frames", i.e. the battery housing (these are generally referred to as flow frames for membrane and electrode assemblies and endcaps for TE assemblies). The electrode and frame plastics are modified to improve the insert molding bond between these materials. Both materials contain a high MFI polypropylene in the range of 60-120 gm/10 min at 230° C., 2.16 kg. Both materials also contain a polyolefin elastomer (ethyleneoctene copolymer). These additives increase the mobility and miscibility of the plastics and result in greater cohesion between the insert and the injected frame.

The inserts are also preheated to at least 200 deg F. immediately prior to the insert molding process. This has a twofold purpose, firstly it decreases the heat transfer required from the injected plastic to melt the surface of the insert, thus increasing the time in which both materials are in the molten state, therefore creating a more intermixed and consistent bond. Secondly it reduces the compression on the insert as the frame material shrinks after molding. Reduced compression results in flatter and lower stressed parts, which improves the cell gap and overall dimensional consistency.

Manufacturing Techniques for Applying Activation Layers to the Electrode Material There are currently three techniques used to apply activation layers to the electrode material. The first is used to apply a granular activated carbon, the second and third processes are used to apply carbon materials in sheet form (e.g. papers, felts, gas diffusion layers).

1) Conductive glue is applied to the electrode sheet using a porous roller. The sheet is then immediately immersed in a fluidized bed of the granular activated carbon. This sheet is then left to dry before pressing it under pressure and heat so that the carbon granules are partially submerged in the electrode sheet. This results in a permanent mechanical bond between the carbon and the plastic sheet.
2) The carbon activation layer sheet is applied to the electrode sheet during extrusion of the electrode in a laminating process. Depending on the type of activation layer it may or may not require a transfer sheet for stability during the transfer process.
3) The activation layer is placed (or glued as per process 1) on the electrode sheet and then pressed under pressure and heat. As per process 1 this partially submerges the activation layer into the electrode creating a mechanical bond.

Terminal Electrode 55 Manufacturing Procedure.

The terminal electrode is the current collecting point for the zinc bromine battery. The current design uses a metal lug or busbar, which is connected to a metal mesh material using either a soldering or metal welding process. The metal mesh is imbedded into a conductive carbon plastic sheet to form the terminal electrode.

For the current production method, the Aluminum current collector (comprising of an ultrasonically welded assembly of an expanded mesh and bus bar) is placed in a compression mold along with sheets of electrode material cut to fit the TE mold. This mold in then heated under pressure using a Wabash press. The plastic then melts and is formed into the desired TE shape. The mold is then cooled under pressure, and the mold can be opened and the part removed. The excess material (flash) is then removed. This part can be used as an anode TE but must be coated with an activation layer if it is to be a cathode TE.

Terminal Electrode 55 Manufacturing Process. Injection Molded TE

A newly developed overmolding process has been developed to provide a flat terminal electrode and to bond the overmolded flow frame material to the conductive carbon plastic sheet of the terminal electrode. A two-shot injection molding process and conductive electrode material is developed to form a terminal electrode with an overmolded end cap in a single mold. One factor in this development effort is to achieve a carbon filled plastic material with acceptable conductivity and the ability to be injection molded. This can be achieved using ultra low molecular weight plastic materials such as polypropylene waxes. The process results in a molded, two-shot multi-component electrode/end cap.

For the multi-shot process, the Aluminum current collector is inserted in an injection mold and the electrode material is injection molded around it. This electrode material needs to be an injection grade material with an MFI>1 gm/10 min at 230° C., 2.16 kg. Whilst the TE is still in the mold the frame material is injected around it to make a complete endcap assembly. The activation layer (for cathode endcaps) is then applied in a later step via a heat and pressure process.

Battery Electrode 55 Material Formulation and Manufacturing Process

The electrode for the V3 battery is an extrusion grade, carbon and glass filled Polypropylene. The formulation is shown below in table 1.

TABLE 1

| Formulation of electrode | |
|---|---|
| Material | Percent composition by weight |
| Low MFI polypropylene | 35-65% |
| High MFI polypropylene | 5-15% |
| Glass fiber | 3-10% |
| Carbon fiber | 2-10% |
| Graphite | 5-15% |
| Carbon black | 7-20% |
| Elastomer | 2-10% |

Where;
MFI: Melt Flow Index in gm/10 min at 230° C., 5 kg
The low MFI polypropylene (PP) has a MFI between 1 and 10 gm/10 min at 230° C., 2.16 kg. This material is required to achieve an extrusion grade material and improves the dispersion of the carbon fillers, which increases material conductivity.
The high MFI polypropylene (PP) has a MFI between 10 and 130 gm/10 min at 230° C., 2.16 kg. This material is used to improve the insert molding process.
The glass fiber is required to improve material stability and resistance to Bromine and thermal expansion.
Graphite is used for material stability and conductivity.
Carbon Black is used for conductivity and allows the electrode material to achieve a bulk resistivity <2 Ω·cm and a surface resistivity <10 Ω/cm$^2$
Polyolefin elastomer is used for improving the insert molding process.

One more specific formulation for the electrode 55 is shown below in table 2 where the MFI is less than one.

TABLE 2

| Formulation of electrode | |
|---|---|
| Material | Percent composition by weight |
| Low MFI polypropylene | 50% |
| High MFI polypropylene | 10% |
| Glass fiber | 5% |
| Carbon fiber | 5% |
| Graphite | 10% |
| Carbon black | 12% |
| Elastomer | 5% |

The materials described above are not all required to be present in the formulation but they illustrate a particular embodiment of the formulation. Alternative components for battery electrode materials include:

Carbon nanotubes, Carbon nanofibers, graphene, micrographites, insert molding adhesion promoters, glass beads, talc, mica, coupling agents, stabilizing fillers, crystallinity promoters and anti-oxidants.

Battery Flow Frame 24 Material Formulation and Manufacturing Process.

The frame material for the battery is an injection grade, glass filled Polypropylene. The Formulation is as shown below in table 3 where the MFI is between about 25 and 50.

TABLE 3

Formulation of battery frame material

| Material | Percent composition by weight |
|---|---|
| Polypropylene | 65-90% |
| Glass fiber | 5-15% |
| Coupling Agent | 0.5-7.0% |
| Elastomer | 3-15% |

Where:
The MFI (Melt Flow Index) of the final compound is between 12 and 50 gm/10 min at 230° C., 2.16 kg
The PP (polypropylene) can be a single type or a blend to achieve the final desired MFI.
Glass Fiber is used to reduce the material shrinkage.
A coupling agent (Maleic Anhydride Modified Polypropylene) is used for bonding the glass to polypropylene, which improves the material strength, stability and Bromine resistance.
A polyolefin elastomer (ethyleneoctene copolymer) is used for improving insert molding process.

One more specific formulation for the flow frame 24 is shown below in table 4 where the MFI is about 40.

TABLE 4

Formulation of battery frame material

| Material | Percent composition by weight |
|---|---|
| Polypropylene | 70% |
| Glass fiber | 15% |
| Coupling Agent | 5% |
| Elastomer | 10% |

The materials described above are not all required to be present in the formulation but they illustrate a particular embodiment of the formulation. Alternative components for frame materials include:
Insert molding adhesion promoters, glass beads, talc, mica, coupling agents, stabilizing fillers, crystallinity promoters and anti-oxidants.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of controlling the level of charge on a battery connected to a DC bus via a power converter, comprising the steps of:
receiving a command at the power converter to begin discharging the battery;
regulating current flow from the battery to the DC bus at a first amplitude by generating a plurality of switching signals within the power converter to control a plurality of switching devices located within the power converter to selectively connect the battery to the DC bus;
monitoring an amplitude of voltage present on the battery;
increasing the frequency at which the switching signals are generated when the amplitude of voltage present on the battery reaches a first threshold;
regulating current flow from the battery to the DC bus at a second amplitude when the amplitude of voltage present on the battery reaches the first threshold;
latching on at least one of the switching devices when the amplitude of voltage present on the battery reaches a second threshold; and
disabling the discharging of the battery when the amplitude of voltage present on the battery is substantially zero.

2. The method of claim 1 wherein regulating current flow between the battery and the DC bus at a first amplitude is performed with a first polarity of voltage on the battery and wherein after disabling the discharging of the battery, the method further comprises the step of regulating current flow between the battery and the DC bus by generating a plurality of switching signals within the power converter to control the plurality of switching devices to selectively connect the battery to the DC bus according to a second polarity, where the second polarity is opposite the first polarity.

3. The method of claim 1 wherein the frequency at which the switching signals are generated is a function of one of the voltage present and the desired power losses at the battery.

4. A method of controlling the level of charge on a battery connected to a DC bus via a power converter, comprising the steps of:
receiving a command at the power converter to begin discharging the battery;
regulating current flow between the battery and the DC bus by generating a plurality of switching signals within the power converter to control a plurality of switching devices located within the power converter to selectively connect the battery to the DC bus according to a first polarity;
monitoring the amplitude of voltage present on the battery;
regulating current flow from the battery to the DC bus at a first amplitude;
increasing the frequency at which the switching signals are generated when the amplitude of voltage present on the battery reaches a first threshold;
regulating current flow from the battery to the DC bus at a second amplitude when the amplitude of voltage present on the battery reaches the first threshold; and
latching on at least one of the switching devices when the amplitude of voltage present on the battery reaches a second threshold;
disabling the discharging of the battery when the amplitude of voltage present on the battery is substantially zero; and
regulating current flow between the battery and the DC bus by generating a plurality of switching signals within the power converter to control the plurality of switching devices to selectively connect the battery to the DC bus according to a second polarity, where the second polarity is opposite the first polarity.

5. The method of claim 4 wherein the frequency at which the switching signals are generated is a function of one of the voltage present and the desired power losses at the battery.

* * * * *